(12) United States Patent
Takahashi et al.

(10) Patent No.: US 11,790,200 B2
(45) Date of Patent: Oct. 17, 2023

(54) LIQUID DISCHARGE APPARATUS, LIQUID DISCHARGING METHOD, AND RECORDING MEDIUM STORING PROGRAM FOR CONTROLLING BANDING AND GRANULARITY

(71) Applicants: Kenta Takahashi, Kanagawa (JP); Daiki Marumo, Kanagawa (JP); Hironobu Murai, Kanagawa (JP)

(72) Inventors: Kenta Takahashi, Kanagawa (JP); Daiki Marumo, Kanagawa (JP); Hironobu Murai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/095,142

(22) Filed: Jan. 10, 2023

(65) Prior Publication Data

US 2023/0252255 A1 Aug. 10, 2023

(30) Foreign Application Priority Data

Feb. 10, 2022 (JP) ................................ 2022-019794

(51) Int. Cl.
*G06K 15/10* (2006.01)
*G06K 15/02* (2006.01)

(52) U.S. Cl.
CPC ....... *G06K 15/107* (2013.01); *G06K 15/1876* (2013.01); *G06K 15/1881* (2013.01)

(58) Field of Classification Search
CPC ........ H04N 1/405; H04N 1/52; G06K 15/107; G06K 15/1876; G06K 15/1881
See application file for complete search history.

(56) References Cited

U.S. PATENT DOCUMENTS

| | | | |
|---|---|---|---|
| 11,623,455 B2 * | 4/2023 | Abe | ...................... G06K 15/107 347/14 |
| 2002/0171874 A1 | 11/2002 | Hirano et al. | |
| 2010/0182367 A1 | 7/2010 | Takagi et al. | |
| 2022/0111659 A1 | 4/2022 | Abe et al. | |
| 2022/0111666 A1 | 4/2022 | Saito et al. | |

FOREIGN PATENT DOCUMENTS

| | | |
|---|---|---|
| JP | 2003-046777 | 2/2003 |
| JP | 2011-116096 | 6/2011 |
| JP | 2012-116196 | 6/2012 |
| JP | 2013-035209 | 2/2013 |
| JP | 2016-043651 | 4/2016 |

* cited by examiner

*Primary Examiner* — Barbara D Reinier
(74) *Attorney, Agent, or Firm* — Duft & Bornsen, PC

(57) ABSTRACT

A liquid discharge apparatus, a method of discharging liquid, and a recording medium storing a program for causing a computer to execute the method. The liquid discharge apparatus and the method includes obtaining image data to be printed, performing dithering to achieve masking and halftone processing on the image data to generate print data, and controlling movement of a discharge head and discharge of ink based on the print data. The controlling includes increasing a ratio of a number of ink dots continuously discharged onto a recording medium in a grayscale on a shadow side to a total number of ink dots discharged onto the recording medium in one-time scanning by the discharge head in one line to be greater than a ratio of a number of ink dots continuously discharged onto the recording medium in a grayscale on a highlight side to the total number of ink dots.

6 Claims, 26 Drawing Sheets

HIGHLIGHT ←————————————————→ SHADOW

HIGHLIGHT ←————————————————→ SHADOW

HIGHLIGHT ←————————————————→ SHADOW

▨ OVERLAPPING PORTION

FIG. 12

PERFORM DITHERING TO ACHIEVE MASKING
(RATIO OF 4 IN HORIZONTAL DIRECTION TO
10 IN VERTICAL DIRECTION)

| | | | | |
|---|---|---|---|---|
| 10 | −1 | 32 | −1 | 80 |
| 9 | 96 | 128 | −1 | −1 |
| 8 | −1 | −1 | 192 | 64 |
| 7 | 32 | 208 | −1 | −1 |
| 6 | −1 | −1 | 192 | 64 |
| 5 | 64 | 240 | 160 | −1 |
| 4 | −1 | 1 | 144 | 224 |
| 3 | 48 | 192 | 240 | −1 |
| 2 | −1 | 16 | 144 | 224 |
| 1 | 0 | 128 | 240 | −1 |

NOZZLE No.

FIG. 13B

2ND SCANNING

| NOZZLE No. | | | | |
|---|---|---|---|---|
| 10 | −1 | 32 | −1 | 80 |
| 9 | 96 | 128 | −1 | −1 |
| 8 | −1 | −1 | 192 | 64 |
| 7 | 32 | 208 | −1 | −1 |
| 6 | | | | |
| 5 | 64 | 240 | 160 | −1 |
| 4 | −1 | 1 | 144 | 224 |
| 3 | 48 | 192 | 240 | −1 |
| 2 | −1 | 16 | 144 | 224 |
| 1 | 0 | 128 | 240 | −1 |

23

P

| FIG. 14 | FIG. 14A | FIG. 14B | FIG. 14C | FIG. 14D |

FIG. 14B

2ND SCANNING

| NOZZLE No. | | | | |
|---|---|---|---|---|
| 10 | −1 | 32 | −1 | 80 |
| 9 | 96 | 128 | −1 | −1 |
| 8 | −1 | −1 | 192 | 64 |
| 7 | 32 | 208 | −1 | −1 |
| 6 | | | | |
| 5 | 64 | 240 | 160 | −1 |
| 4 | −1 | 1 | 144 | 224 |
| 3 | 48 | 192 | 240 | −1 |
| 2 | −1 | 16 | 144 | 224 |
| 1 | 0 | 128 | 240 | −1 |

| FIG. 16A |
|----------|
| FIG. 16B |

MATRIX FOR MASKING
(RATIO OF 4 IN HORIZONTAL DIRECTION TO 10 IN VERTICAL DIRECTION)

| | | | | |
|---|---|---|---|---|
| 10 | −1 | −1 | −1 | −1 |
| 9 | −1 | −1 | −1 | −1 |
| 8 | −1 | −1 | −1 | −1 |
| 7 | −1 | −1 | −1 | −1 |
| 6 | −1 | −1 | −1 | −1 |
| 5 | −1 | −1 | −1 | −1 |
| 4 | −1 | −1 | −1 | −1 |
| 3 | −1 | −1 | −1 | −1 |
| 2 | −1 | −1 | −1 | −1 |
| 1 | −1 | −1 | −1 | −1 |

NOZZLE No.

GENERATE FULLY-SCANNED IMAGE USING MATRIX FOR MASKING

3/8
5/10
2/7
4/9
1/6

NOZZLE No.

GENERATE SCANNING-UNIT IMAGE USING MATRIX FOR MASKING 10
9
8
7
6
5
4
3
2
1

NOZZLE No.

| FIG. 17A |
|---|
| FIG. 17B |

MATRIX FOR MASKING
(RATIO OF 4 IN HORIZONTAL DIRECTION TO 10 IN VERTICAL DIRECTION)

| | | | | |
|---|---|---|---|---|
| 10 | −1 | −1 | −1 | −1 |
| 9 | −1 | −1 | −1 | −1 |
| 8 | −1 | −1 | −1 | −1 |
| 7 | −1 | −1 | −1 | −1 |
| 6 | −1 | −1 | −1 | −1 |
| 5 | −1 | −1 | −1 | −1 |
| 4 | −1 | −1 | −1 | −1 |
| 3 | −1 | −1 | −1 | −1 |
| 2 | −1 | −1 | −1 | −1 |
| 1 | 0 | −1 | −1 | −1 |

NOZZLE No.

GENERATE FULLY-SCANNED IMAGE USING MATRIX FOR MASKING

3/8
5/10
2/7
4/9
1/6

NOZZLE No.

GENERATE SCANNING-UNIT IMAGE USING MATRIX FOR MASKING 10
9
8
7
6
5
4
3
2
1

NOZZLE No.

FIG. 18
| FIG. 18A |
|---|
| FIG. 18B |
FIG. 18A
MATRIX FOR MASKING
(RATIO OF 4 IN HORIZONTAL DIRECTION
TO 10 IN VERTICAL DIRECTION)
| | | | | |
|---|---|---|---|---|
| 10 | −1 | −1 | −1 | −1 |
| 9 | −1 | −1 | −1 | −1 |
| 8 | −1 | −1 | −1 | −1 |
| 7 | −1 | −1 | −1 | −1 |
| 6 | −1 | −1 | 1 | −1 |
| 5 | −1 | −1 | −1 | −1 |
| 4 | −1 | −1 | −1 | −1 |
| 3 | −1 | −1 | −1 | −1 |
| 2 | −1 | −1 | −1 | −1 |
| 1 | 0 | −1 | −1 | −1 |
NOZZLE No.
GENERATE
FULLY-SCANNED IMAGE
USING MATRIX FOR MASKING
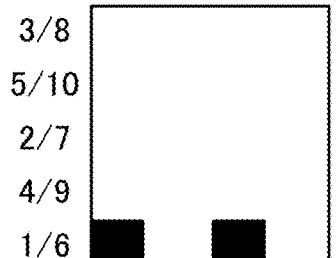
GENERATE
SCANNING-UNIT IMAGE
USING MATRIX FOR MASKING
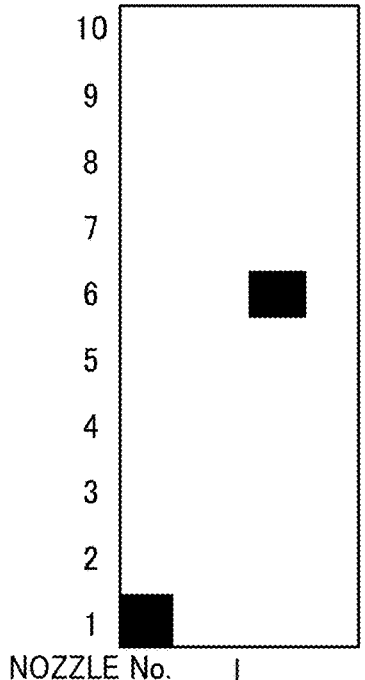

FIG. 19A
FIG. 19
| FIG. 19A |
| FIG. 19B |
MATRIX FOR MASKING
(RATIO OF 4 IN HORIZONTAL DIRECTION
TO 10 IN VERTICAL DIRECTION)
| | | | | |
|---|---|---|---|---|
| 10 | −1 | −1 | −1 | −1 |
| 9 | −1 | −1 | −1 | −1 |
| 8 | −1 | −1 | −1 | −1 |
| 7 | −1 | −1 | −1 | −1 |
| 6 | −1 | −1 | 1 | −1 |
| 5 | −1 | −1 | −1 | −1 |
| 4 | −1 | −1 | −1 | −1 |
| 3 | −1 | 2 | −1 | −1 |
| 2 | −1 | −1 | −1 | −1 |
| 1 | 0 | −1 | −1 | −1 |
NOZZLE No.
GENERATE FULLY-SCANNED IMAGE USING MATRIX FOR MASKING
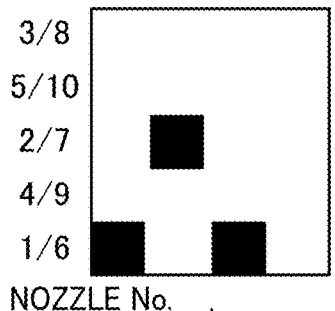
NOZZLE No.
GENERATE SCANNING-UNIT IMAGE USING MATRIX FOR MASKING
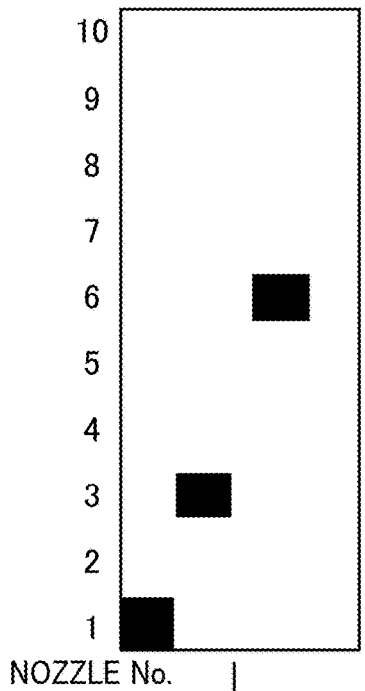
NOZZLE No.

LIQUID DISCHARGE APPARATUS, LIQUID DISCHARGING METHOD, AND RECORDING MEDIUM STORING PROGRAM FOR CONTROLLING BANDING AND GRANULARITY

CROSS-REFERENCE TO RELATED APPLICATION

This patent application is based on and claims priority pursuant to 35 U.S.C. § 119(a) to Japanese Patent Application No. 2022-019794, filed on Feb. 10, 2022, in the Japan Patent Office, the entire disclosure of which is hereby incorporated by reference herein.

BACKGROUND

Technical Field

Embodiments of the present disclosure relate to a liquid discharge apparatus, a liquid discharging method, and a recording medium storing a program.

Background Art

In the related art, as liquid discharge apparatuses used in office environments, for example, ink-jet printers have been proposed that perform image processing by discharging inks from multiple inkjet heads and making the discharged inks adhere to a recording medium. In the image processing of such ink-jet printers, halftoning to achieve masking and renderings to achieve masking are performed separately. More specifically, in the image processing of such ink-jet printers, firstly, halftone processing is performed, and then renderings are performed to assign the ejection nozzles for each time of scanning.

As technologies to control the discharge in such ink-jet printers in order to expand the color gamut of a low-brightness portion, an ink-jet printer has been proposed that includes a generation unit that generates, based on the input image, black colorant data used to dispose the dots of black colorant on a recording medium and a plurality of kinds of chromatic colorant data used to dispose the dots of each of a plurality of kinds of chromatic colorant on a recording medium, and a forming unit that uses the black colorant and the multiple kinds of chromatic colorant to form an image on a recording medium based on the black colorant data and the multiple kinds of chromatic colorant data. In such an ink-jet printer, the generation unit generates the colorant data in which a plurality of dots of different sizes are arranged, and the dots of black colorant and the dots of each of a plurality of kinds of chromatic colorant are arranged such that the size of one dot is made different from the size of another adjacent dot when the colorant data is generated.

In the related art, image forming apparatuses have been proposed that are provided with the first recording head and the second recording head having a plurality of nozzles in a specific direction. Such image forming apparatuses form an image using the first recording head and the second recording head in which a predetermined number of nozzles coupled to each other so as to overlap with each other in a specified direction. Due to such a configuration, the banding can be reduced. Further, such an image forming apparatuses include a print controller that controls the formation of dots using a predetermined number of nozzles in an overlapping area in which dots are formed by the predetermined number of nozzles. In particular, the print controller of such image forming apparatuses controls the density of the dots and the number of continuous dots in a direction orthogonal to the above specific direction so as to be smaller in the edges of each one of the multiple recording heads in the above specific direction than in the center of the overlapping area in the above specific direction.

SUMMARY

Embodiments of the present disclosure described herein provide a liquid discharge apparatus, a method of discharging liquid, and a recording medium storing a program for causing a computer to execute a method. The liquid discharge apparatus and the method includes obtaining image data to be printed, performing dithering to achieve masking and halftone processing on the image data to generate print data, and controlling movement of a discharge head and discharge of ink based on the print data. The controlling includes increasing a ratio of a number of ink dots of the ink continuously discharged onto a recording medium in a main scanning direction in a grayscale on a shadow side indicated by the print data to a total number of ink dots of the ink discharged onto the recording medium in one-time scanning by the discharge head in one line in the main scanning direction to be greater than a ratio of a number of ink dots of the ink continuously discharged onto the recording medium in the main scanning direction in a grayscale on a highlight side indicated by the print data to the total number of ink dots of the ink discharged onto the recording medium in the one-time scanning by the discharge head in the one line in the main scanning direction, and increasing a ratio of a number of points at which ink dots of the ink are superimposed on top of one another in the grayscale on the shadow side indicated by the print data to all points on the recording medium in the one line in the main scanning direction when the ink is discharged at same coordinates on the recording medium in a one-time scanning and another one-time scanning performed by the discharge head to be greater than a ratio of a number of points at which ink dots of the ink are superimposed on top of one another in the grayscale on the highlight side indicated by the print data to all points on the recording medium in the one line in the main scanning direction when the ink is discharged at same coordinates on the recording medium in the one-time scanning and the another one-time scanning performed by the discharge head.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 12 is a diagram illustrating the dithering to achieve masking, which is used in the halftone processing performed by a liquid discharge apparatus, according to an embodiment of the present disclosure.

FIG. 13A, FIG. 13B, FIG. 13C, and FIG. 13D are diagrams each illustrating the printing processes based on the image data of 100% grayscale in a liquid discharge apparatus, according to an embodiment of the present disclosure.

FIG. 14A, FIG. 14B, FIG. 14C, and FIG. 14D are diagrams each illustrating the printing processes based on the image data of 50% grayscale in a liquid discharge apparatus, according to an embodiment of the present disclosure.

FIG. 16A and FIG. 16B are diagrams each illustrating how masking processes are repeated in the first loop in a liquid discharge apparatus according to an embodiment of the present disclosure.

FIG. 17A and FIG. 17B are diagrams each illustrating how masking processes are repeated in the second loop in a liquid discharge apparatus according to an embodiment of the present disclosure.

FIG. 18A and FIG. 18B are diagrams each illustrating how masking processes are repeated in the third loop in a liquid discharge apparatus according to an embodiment of the present disclosure.

FIG. 19A and FIG. 19B are diagrams each illustrating how masking processes are repeated in the fourth loop in a liquid discharge apparatus according to an embodiment of the present disclosure.

Figure 1:
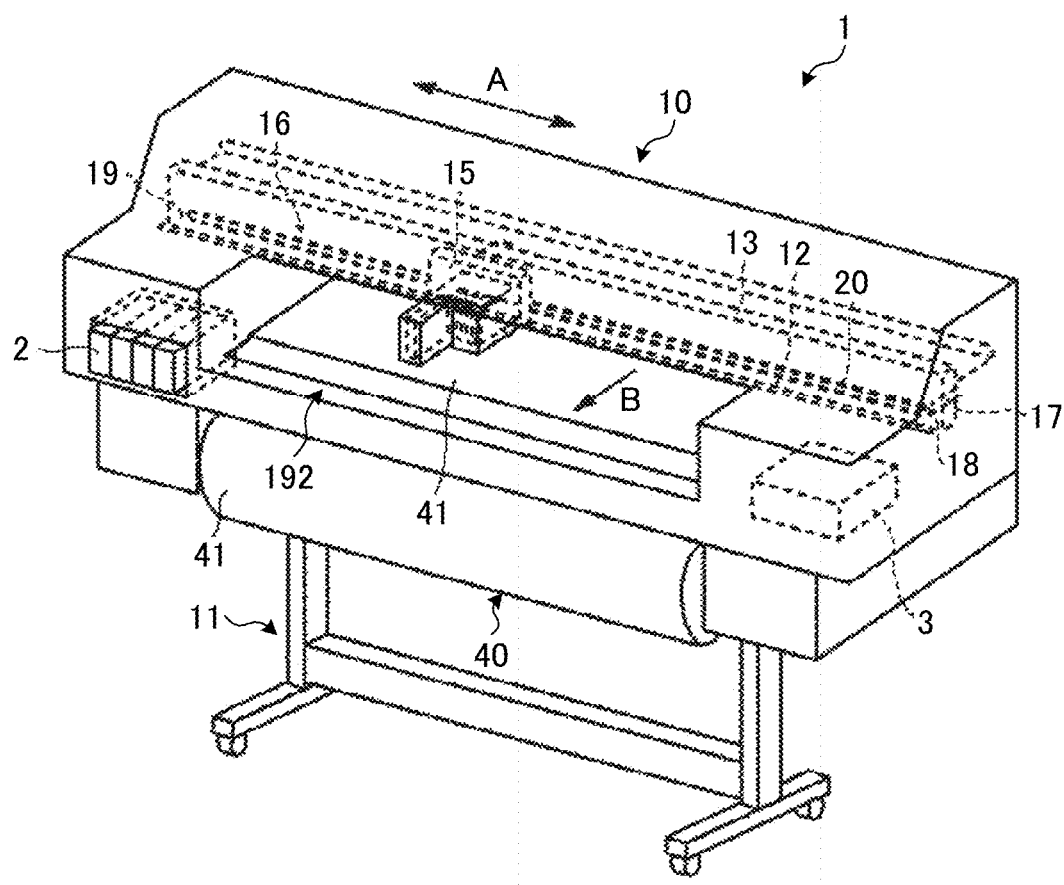
FIG. 1 is an external perspective view of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers, or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

A liquid discharge apparatus, a method of discharging liquid, and a non-transitory recording medium storing a program according to an embodiment of the present disclosure are described below in detail with reference to the accompanying drawings.

The term computer software used in the embodiments of the present disclosure refers to, for example, a program related to the operation of the computer and other kinds of data that are used for data processing in computers and function in a similar manner to programs. In the following description, such computer software may be referred to simply as software. In the classification of software, software that is used to perform a specific task or operation may collectively be referred to as application software. Moreover, in the embodiments of the present disclosure, an operating system (OS) refers to software used to control a computer and enable application software or the like to use computer resources. The operating system performs basic management and control of the computer such as control of input-and-output, management of hardware such as a memory and a hard disk, and management of processes.

The application software operates using a function provided by the operating system. A program refers to a combination of instructions given to a computer to obtain one result. What functions in a similar manner to programs cannot be referred to as a program because it is not an instruction directly given to a computer. However, what functions in a similar manner to programs has a nature similar to a program in regulating the processes of a computer. For example, a data structure such as the logical structure of the data expressed by a mutual relation among data elements serves as what functions in a similar to programs.

FIG. 1 is an external perspective view of a liquid discharge apparatus 1 according to the present embodiment.

Figure 2:
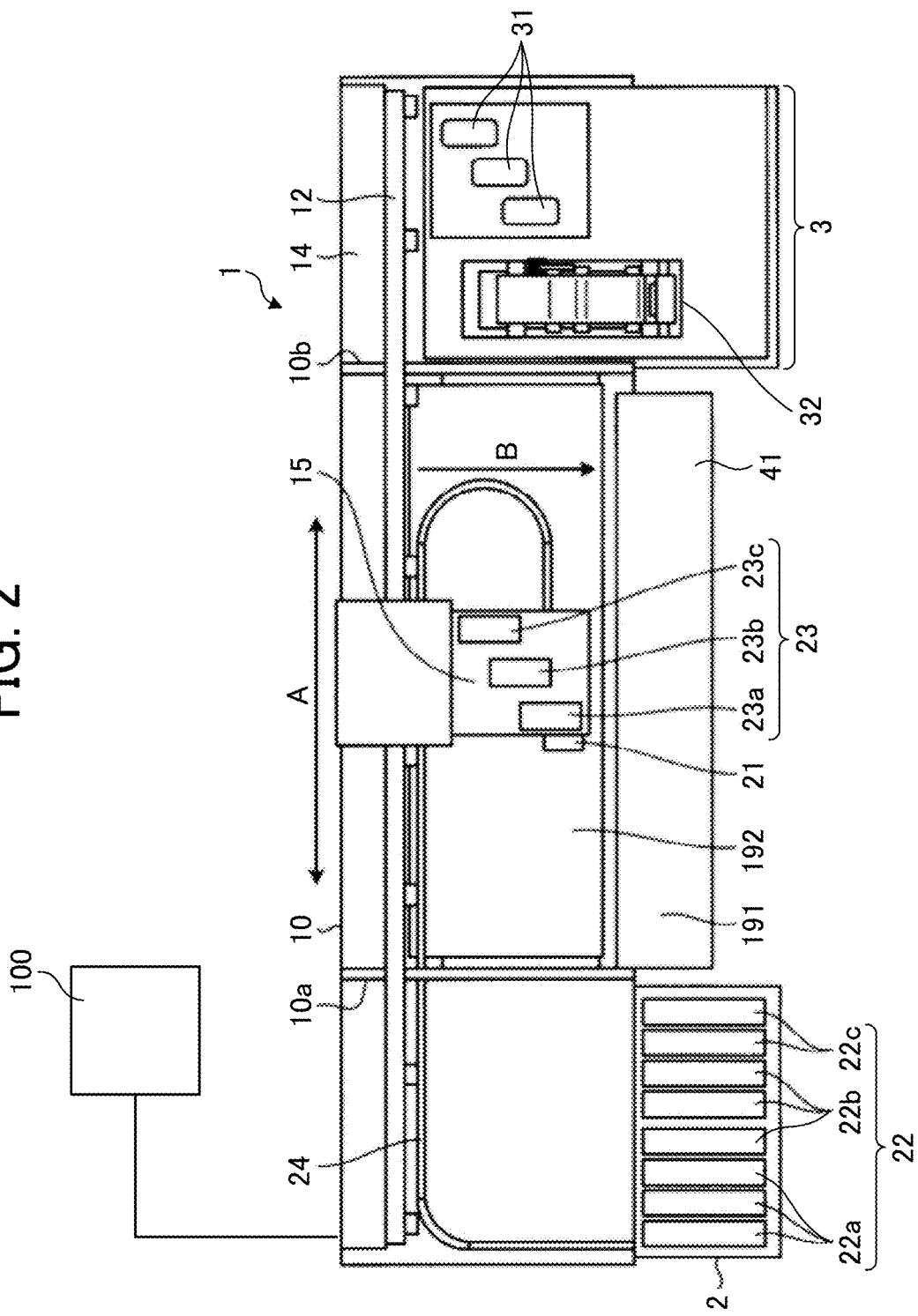
FIG. 2 is a diagram illustrating a schematic configuration of a liquid discharge apparatus according to an embodiment of the present disclosure.

FIG. 2 is a diagram illustrating a schematic configuration of the liquid discharge apparatus 1 according to the present embodiment.

An overall configuration of the liquid discharge apparatus 1 according to the present embodiment is described with reference to FIG. 1 and FIG. 2.

The liquid discharge apparatus 1 according to the present embodiment serves as a multi-pass serial printer. The liquid discharge apparatus 1 may be, for example, a multi-pass serial printer or multi-pass multi-layer printer that uses a compact inkjet system. As illustrated in FIG. 1 and FIG. 2, the liquid discharge apparatus 1 according to the present embodiment includes a housing 10, a support base 11 that supports the housing 10, and a control unit 100.

As illustrated in FIG. 1 and FIG. 2, the housing 10 is provided with a cartridge case 2, a maintenance-and-recovery unit 3, a pair of side plates 10a and 10b, a guide rod 12, a guide stay 13, a sub-guide 14 made of sheet metal, a carriage 15, a main scanning mechanism 16, an optical sensor 21, multiple liquid discharge heads 23a, 23b, and 23c, a supply tube 24, a sheet feed unit 40, a conveyance guide plate 191, and a platen 192.

The cartridge case 2 is a loader in which ink cartridges 22a, 22b, and 22c of different colors can removably be mounted. The ink cartridges 22a, 22b, and 22c may be referred to simply as the ink cartridge 22 when any desired one of the ink cartridges is referred to or when those ink cartridges are collectively referred to. The ink that is filled in the ink cartridge 22 is supplied to the sub-tank of the carriage 15 through the supply tube 24 of each color by a supply pump unit. The ink cartridge 22 may include, for example, a white ink cartridge.

The maintenance-and-recovery unit 3 according to the present embodiment is a mechanism used to maintain and recover the conditions of the multiple liquid discharge heads 23a, 23b, and 23c placed in a non-printing area on one side of the carriage 15 in the main scanning direction. The maintenance-and-recovery unit 3 according to the present embodiment is provided with a plurality of caps 31 that cap the faces of the multiple nozzle plates of the liquid discharge heads 23a, 23b, and 23c and a wiping unit 32 that wipes the face of the multiple nozzle plates. A replaceable waste liquid tank that stores the waste liquids caused by the maintenance and recovery operation is arranged under or at a lower portion of the maintenance-and-recovery unit 3.

The guide rod 12 and the guide stay 13, which serve as a pair of guide units, are bridged over the pair of side plates 10a and 10b.

The guide rod 12 and the guide stay 13 are guide units that slidably hold the carriage 15 in the main scanning direction. The sub-guide 14 made of sheet metal is a guide unit that supports the rear side of the housing 10.

The carriage 15 is a member that is moved in the main scanning direction parallel to the direction indicated by A in FIG. 1 by the main scanning mechanism 16. More specifically, the carriage 15 moves in the main scanning direction through the timing belt 20 that is driven to rotate by the main-scanning motor 17. The carriage 15 is provided with a plurality of sub-tanks used to supply the multiple liquid discharge heads 23a, 23b, and 23c with inks of multicolor.

The main scanning mechanism 16 is a mechanism used to reciprocate the carriage 15 in the main scanning direction parallel to the direction indicated by A in FIG. 1. As illustrated in FIG. 1, the main scanning mechanism 16 includes a main-scanning motor 17, a driving pulley 18, a driven pulley 19, and a timing belt 20.

The main-scanning motor 17 is arranged on one side in the main scanning direction and drives the timing belt 20 to rotate and move. The timing belt 20 is looped around the driving pulley 18, and the driving pulley 18 is driven to rotate by the main-scanning motor 17. The timing belt 20 is also looped around the driven pulley 19, and the driven pulley 19 is arranged on the other side of the driving pulley 18 in the main scanning direction. The driven pulley 19 is stretched outward by a pulling spring in a direction away from the driving pulley 18. The timing belt 20 is a drawing member looped around the driving pulley 18 and the driven pulley 19, and is driven to rotate and move by the rotation of the main-scanning motor 17.

The optical sensor 21 is an optical sensor mounted on the carriage 15, and detects an end of a sheet 41 that serves as a recording medium.

The multiple liquid discharge heads 23a, 23b, and 23c are recording heads that are mounted on the carriage 15, and discharge inks of different colors such as black (K), yellow (Y), magenta (M), and cyan (C) from rows of nozzles depending on the ink cartridges 22. The multiple liquid discharge heads 23a, 23b, and 23c may be referred to simply as the liquid discharge head 23 when any desired one of the multiple liquid discharge heads is referred to or when those liquid discharge heads are collectively referred to. The liquid discharge head 23 according to the present embodiment has a plurality of rows of nozzles that are arrayed in the direction indicated by B parallel to the sub-scanning direction. In the present embodiment, the sub-scanning direction is a direction in which the sheet 41 is conveyed parallel to the direction indicated by B in FIG. 1, and is orthogonal to the main scanning direction. The liquid discharge head 23 is fitted to the carriage 15 such that the inks are discharged downward and toward the sheet 41 from the rows of nozzles. The multiple liquid discharge heads 23a, 23b, and 23c are arranged so as to be shifted from each other in the sub-scanning direction.

The supply tube 24 is a tube used to supply the ink filled in the ink cartridge 22 to the sub-tank of the carriage 15.

The sheet feed unit 40 is a mechanism for conveying the sheet 41 on the platen 192 in the sub-scanning direction.

The conveyance guide plate 191 is a guide unit that guides the sheet 41 being conveyed on the platen 192. The platen 192 is a member to which the sheet 41 is conveyed by the sheet feed unit 40.

The control unit 100 according to the present embodiment is a controller used to control the operation of the liquid discharge apparatus 1. In FIG. 2, the control unit 100 is placed outside the housing 10 of the liquid discharge apparatus 1. However, no limitation is indicated thereby, and the control unit 100 according to the present embodiment may be installed inside the housing 10 of the liquid discharge apparatus 1, or may be an external device separate from the liquid discharge apparatus 1.

Figure 3:
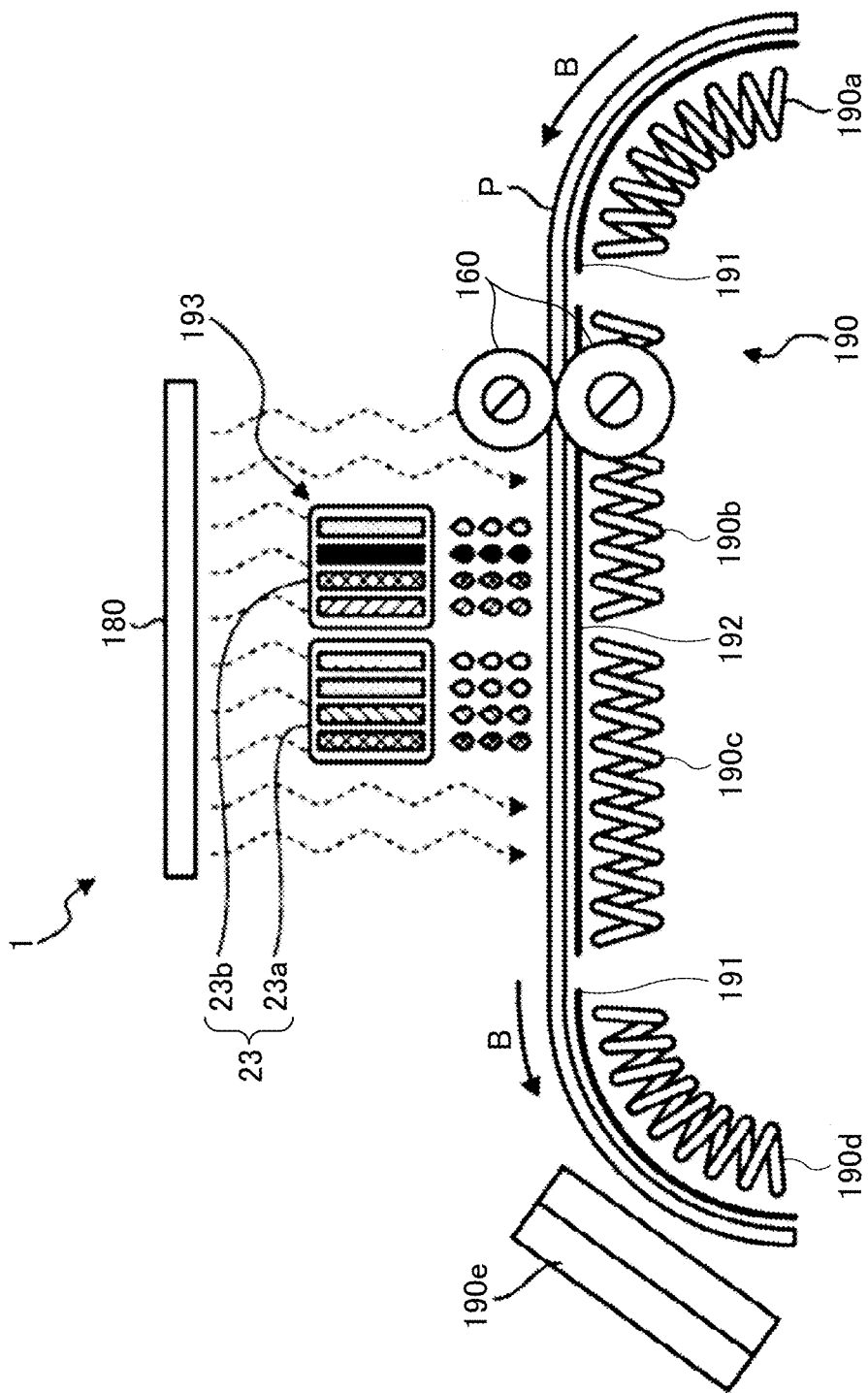
FIG. 3 is a diagram illustrating a schematic configuration of a heater of a liquid discharge apparatus according to an embodiment of the present disclosure.

FIG. 3 is a diagram illustrating a schematic configuration of a heater unit 190 of the liquid discharge apparatus 1 according to the present embodiment.

As illustrated in FIG. 3, the liquid discharge apparatus 1 includes a conveyance roller 160, a fan 180, and the heater unit 190.

The conveyance roller 160 according to the present embodiment is a roller pair that conveys, from the conveyance guide plate 191, the recording medium P, which corresponds to the sheet 41 illustrated in FIG. 1, in the sub-scanning direction parallel to the direction indicated by B in FIG. 1 and FIG. 2, on the platen 192. The recording medium P conveyed onto the platen 192 by the conveyance roller 160 is subjected to image formation by the ejection of ink from the multiple liquid discharge heads 23.

The fan 180 is a blower that accelerates the convection of air inside the liquid discharge apparatus 1, and prevents the temperature from increasing excessively due to the accumulation of warmed air in an upper portion of the liquid discharge apparatus 1.

The heater unit 190 according to the present embodiment includes a pre-heater 190a, a pair of print heaters 190b and 190c, a post-heater 190d, and a drying heater 190e. Each one of the heaters of the heater unit 190 is provided with a temperature sensor such as a thermistor used for temperature control.

The pre-heater 190a is a heater that preheats the recording medium P to a temperature suitable for image formation.

For example, the pre-heater 190a may be a cord heater made of aluminum foil. The pre-heater 190a is installed on the rear side of the conveyance guide plate 191 upstream from the platen 192, and directly heats the conveyance guide plate 191. By so doing, the recording medium P is heated accordingly.

The pair of print heaters 190b and 190c are heaters used to keep the temperature of the recording medium P warm when images are formed on the recording medium P. For example, the print heaters 190b and 190c are cord heaters embedded in the platen 192 made of aluminum. The pair of print heaters 190b and 190c directly heat the platen 192 so as to heat the recording medium P.

The post heater 190d is a heater used to heat the recording medium P on which an image is formed in order to dry and fix the ink. For example, the post-heater 190d may be a cord heater made of aluminum foil. The post-heater 190d is installed on the rear side of the conveyance guide plate 191 downstream from the platen 192, and directly heats the conveyance guide plate 191. By so doing, the recording medium P is heated accordingly.

The drying heater 190e is a heater used to heat the recording medium P on which an image is formed in order to dry and fix the ink. For example, the drying heater 190e may be an infrared heater.

The drying heater 190e irradiates the recording medium P with infrared (IR) light to dry the surface of the recording medium P on which an image has been formed. The drying heater 190e may be provided with a fan to send hot air to the surface of the recording medium P on which the image has been formed.

Figure 4:
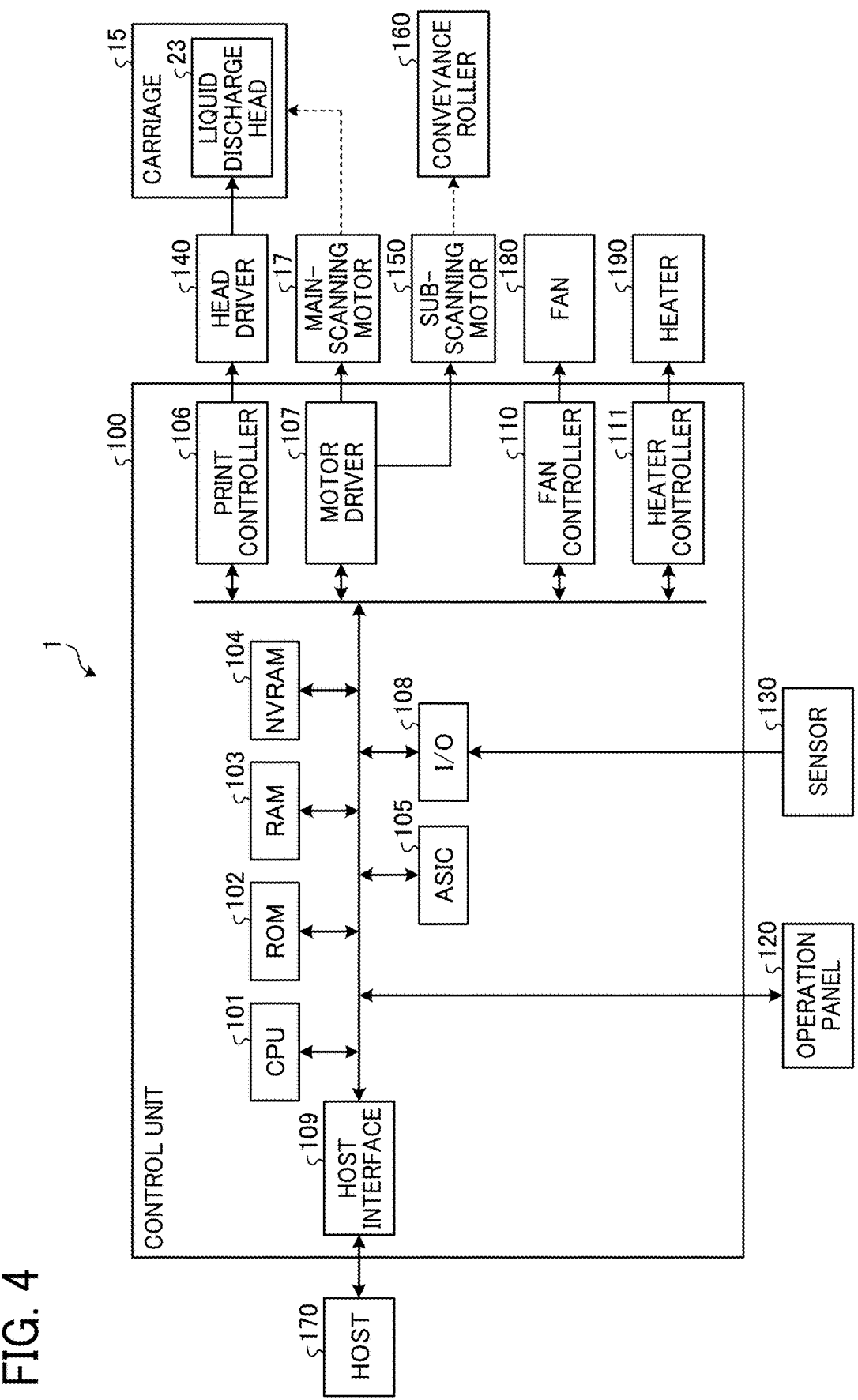
FIG. 4 is a block diagram illustrating a hardware configuration of a liquid discharge apparatus according to an embodiment of the present disclosure.

FIG. 4 is a block diagram illustrating a hardware configuration of the liquid discharge apparatus 1 according to the present embodiment.

As illustrated in FIG. 4, the liquid discharge apparatus 1 includes a control unit 100, an operation panel 120, a sensor 130, a head driver 140, a main-scanning motor 17, a sub-scanning motor 150, a fan 180, and a heater unit 190.

The control unit 100 according to the present embodiment includes a central processing unit (CPU) 101, a read only memory (ROM) 102, a random access memory (RAM) 103, a nonvolatile random access memory (NVRAM) 104, an application-specific integrated circuit (ASIC) 105, a print controller 106, a motor driver 107, an input and output (I/O) interface 108, a host interface (I/F) 109, a fan controller 110, and a heater controller 111.

The CPU 101 according to the present embodiment serves as a computing unit used to control the liquid discharge apparatus 1 as a whole. The ROM 102 is a nonvolatile storage device that stores fixed data such as a program to be executed by the CPU 101.

The RAM 103 is a volatile storage device that serves as a work area for arithmetic processing by CPU 101. The RAM 103 stores, for example, the image data on a temporary basis.

The NVRAM 104 is a nonvolatile storage device that holds the data even while the power supply of the liquid discharge apparatus 1 is cut off. The ASIC 105 according to the present embodiment serves as an integrated circuit (IC) used to perform various kinds of image processing such as signal processing and sorting on the image data or other kinds of processing on an input signal or an output signal to control the liquid discharge apparatus 1 as a whole.

The print controller 106 according to the present embodiment serves as a control circuit that controls the discharging operation of each one of the multiple liquid discharge heads 23 through the head driver 140. The print controller 106 transfers the data used to drive the multiple liquid discharge heads 23 to the head driver 140. For example, the print controller 106 transfers the image data as serial data, and outputs, for example, a transfer clock signal, a latch signal, and a control signal, which are used to transfer the image data, to the head driver 140. The head driver 140 according to the present embodiment receives a driving pulse that makes up the drive waveform from the print controller 106, and selectively gives the received driving pulse to the pressure generator of each one of the multiple liquid discharge heads 23 based on the image data that is serially input and corresponds to a single line of one of the multiple liquid discharge heads 23. By so doing, each one of the multiple liquid discharge heads 23 is driven to discharge ink.

In the present embodiment, some of or all of the pulses that make up the drive waveform is selected, or some of or all of the waveform elements that make up the pulses is selected. Due to such a configuration, different sizes of droplets, e.g., large droplets, medium droplets, and small droplets can selectively be discharged to form different sizes of dots.

The motor driver 107 is a driving circuit used to control the operation of the main-scanning motor 17 and the sub-scanning motor 150. The main-scanning motor 17 moves the carriage 15 in the main scanning direction under the control of the motor driver 107. The sub-scanning motor 150 according to the present embodiment drives the conveyance roller 160 to rotate under the control of the motor driver 107 so as to convey the recording medium P in the sub-scanning direction.

The input and output (I/O) interface 108 is an interface circuit used to obtain the data from the sensor 130 and extract the data used to control each element or unit of the liquid discharge apparatus 1. The sensor 130 is, for example, a group of sensors such as a photodetector, a temperature sensor, and an encoder sensor.

The host interface (I/F) 109 according to the present embodiment serves as an interface circuit used to transmit and receive data and signals to and from the host 170 such as an image reading apparatus, an imaging device, and an information processing device such as a client personal computer (PC). More specifically, the host interface (I/F)

109 transmits and receives data or signals to and from the host 170 through a cable or a network. The print data that is stored in the receive data buffer of the host interface 109 is analyzed by the CPU 101, and is subjected to, for example, image processing and data sorting by the ASIC 105. Then, the resultant data is transferred to the head driver 140 by the print controller 106 as the data to be used when the ink is discharged.

The fan controller 110 is a control circuit used to control the output of the fan 180 so that the air is blown at a predetermined temperature and volume of air.

The heater controller 111 is a control circuit used to control the temperature of the heater unit 190 to a specified temperature.

An operation panel 120 is a device used to receive and output various kinds of information.

The hardware configuration of the liquid discharge apparatus 1 as illustrated in FIG. 4 is given by way of example, and it is not necessary for the liquid discharge apparatus 1 to include all the elements illustrated in FIG. 4. The liquid discharge apparatus 1 may further include other elements not specifically described herein.

In the present embodiment, the recording medium P is conveyed in the sub-scanning direction by the sub-scanning motor 150. However, no limitation is intended thereby, and the carriage 15 may be moved not only in the main scanning direction but also in the sub-scanning direction. For example, the operation of discharging ink when the carriage 15 is moved in the main scanning direction and the operation of moving the carriage 15 in the sub-scanning direction by a predetermined amount may be alternately performed.

Figure 5:
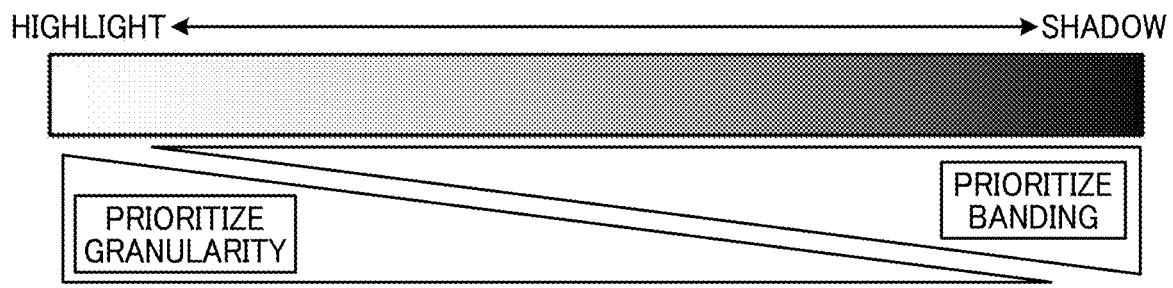
FIG. 5 is a diagram illustrating how the discharge characteristics are changed depending on the grayscale in a liquid ejection apparatus according to an embodiment of the present disclosure.

FIG. 5 is a diagram illustrating how the discharge characteristics are changed depending on the grayscale in the liquid ejection apparatus 1 according to the present embodiment.

Figure 6:
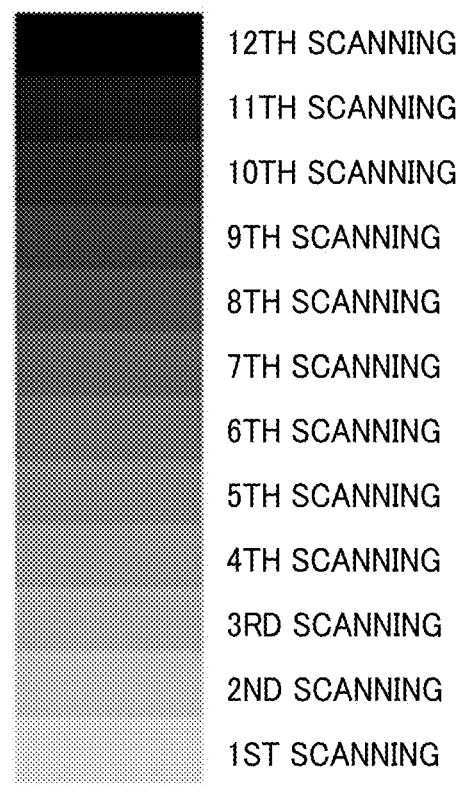
FIG. 6 is a diagram illustrating how the dots differ for each time of scanning in a liquid discharge apparatus when 1/6 interlaced scan and dual paths are adopted, according to an embodiment of the present disclosure.

FIG. 6 is a diagram illustrating how the dots differ for each time of scanning in the liquid discharge apparatus 1 when 1/6 interlaced scan and dual paths are adopted, according to the present embodiment.

Figure 7:
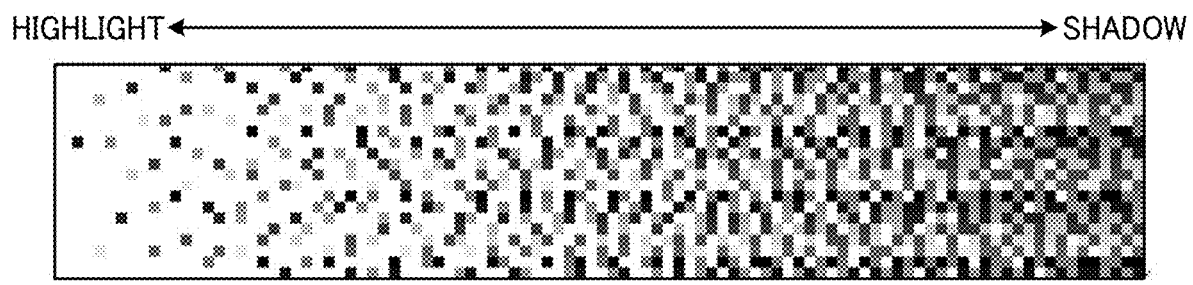
FIG. 7 is a diagram illustrating dot patterns of a liquid discharge apparatus according to the related art.

FIG. 7 is a diagram illustrating a dot pattern of liquid discharge apparatuses known in the art.

Figure 8:
FIG. 8 is a diagram illustrating the dot patterns formed by the continuous discharge control of a liquid ejection apparatus, according to an embodiment of the present disclosure.

FIG. 8 is a diagram illustrating the dot patterns formed by the continuous discharge control of the liquid ejection apparatus 1, according to the present embodiment.

Figure 9:
FIG. 9 is a diagram illustrating the dot patterns formed by the dot superimposition control of a liquid ejection apparatus, according to an embodiment of the present disclosure.

FIG. 9 is a diagram illustrating the dot patterns formed by the dot superimposition control of the liquid ejection apparatus 1, according to the present embodiment.

The operation of the liquid discharge apparatus 1 according to the present embodiment is schematically described with reference to FIG. 5, FIG. 6, FIG. 7, FIG. 8, and FIG. 9.

As the printing conditions of the liquid discharge apparatus 1 according to the present embodiment, for example, a method in which 1/6 interlaced scan and dual paths are adopted and an image is formed by performing scanning twelve times. In FIG. 6, how the dots differ in grayscale over the scanning performed twelve times between the first scanning and the twelfth scanning are indicated by shades of gray. In such cases, the frequency characteristics tend to be prioritized in the related art. Accordingly, as illustrated in FIG. 7, a one-on-one-off keynote is used to ensure the graininess of the print from the highlight side to the shadow side of the gray scale. However, when the landing position of the ink deviates from a desired position, the coverage rate decreases, and such a decrease in coverage rate leads to banding. In particular, the influence or impact of the banding is greater on the shadow side, where the proportion of the image filled with dots is relatively large, than on the highlight side where the proportion of the image filled with dots is relatively small.

In order to handle such a situation, in the liquid discharge apparatus 1 according to the present embodiment, on the shadow side where banding is likely to occur, an image is formed by halftone dot patterns that have good resistance to the banding. As the banding hardly occurs on the highlight side, an image on the highlight side is formed by the halftone dot patterns that have good frequency characteristics and are dedicated to ensuring graininess. In other words, as illustrated in FIG. 5, the liquid discharge apparatus 1 according to the present embodiment performs image formation in which the resistance to the banding is prioritized as the point goes toward the shadow side, and performs image formation in which the graininess is prioritized as the point goes toward the highlight side. More specifically, the liquid discharge apparatus 1 according to the present embodiment performs two kinds of ink discharge control as follows in order to perform the image formation in which the resistance to the banding is prioritized on the shadow side.

Firstly, as the second ink discharge control, the liquid discharge apparatus 1 makes the dot patterns continuous in each time of scanning on the shadow in order to improve the resistance to the banding improves. Such control may be referred to as continuous discharge control in the following description. More specifically, as illustrated in FIG. 8, the liquid discharge apparatus 1 according to the present embodiment performs control such that the ratio of the number of ink dots continuously discharged onto the recording medium (P) in the main scanning direction on the shadow side to the total number of ink dots discharged onto the recording medium (P) in one-time scanning is increased to be greater than the ratio of the number of ink dots continuously discharged onto the recording medium (P) in the main scanning direction on the highlight side to the total number of ink dots discharged onto the recording medium (P) in one-time scanning. As a result, while a desired degree of graininess is achieved on the highlight side, and the resistance to the banding can be increased on the shadow side due to the continuity of the dot patterns achieved by the continuous discharge control.

Secondly, as the second ink discharge control, the liquid discharge apparatus 1 adopts multi-pass printing, and discharges the ink several times at the point of same coordinates on the recording medium on the shadow. Such control may be referred to as overstriking control in the following description. More specifically, as illustrated in FIG. 9, the liquid discharge apparatus 1 according to the present embodiment performs control such that the ratio of the number of points at which ink dots of the ink are superimposed on top of one another on the shadow side to all the points on the recording medium P in one line in the main scanning direction when the ink is discharged at the same coordinates on the recording medium P in one one-time scanning and another one-time scanning performed is increased to be greater than the ratio of the number of points at which ink dots of the ink are superimposed on top of one another on the highlight side to all the points on the recording medium P in one line in the main scanning direction when the ink is discharged at the same coordinates on the recording medium P in the one-time scanning and the other one-time scanning. As a result, the robustness of inks against the deviation of the landing position of dots increases on the shadow side due to the overstriking control, and the resistance to the banding can be increased As described above, in the liquid discharge apparatus 1 according to the present embodiment, the continuous discharge control and the overstriking control are performed depending on the grayscale of the input print image or image data. Due to such a configuration, a desired degree of granularity is achieved on the highlight side and the resistance to the banding improves on the shadow side. The operations and a configuration of the functional blocks to achieve such control of the liquid discharge apparatus 1 is described below in detail.

Figure 10:
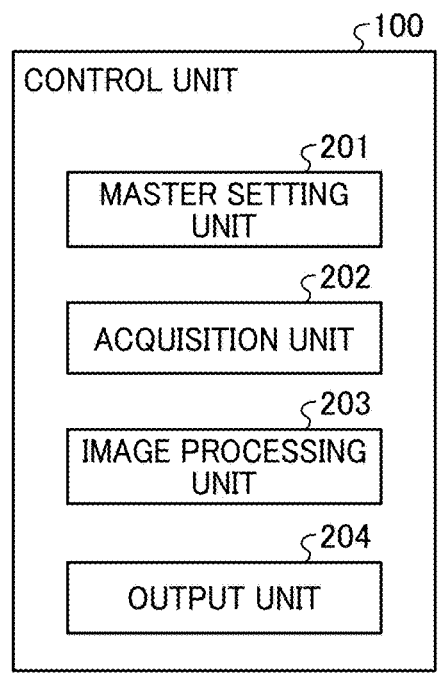
FIG. 10 is a block diagram illustrating a configuration of the functional blocks of a control unit of a liquid discharge apparatus according to an embodiment of the present disclosure.

FIG. 10 is a block diagram illustrating a configuration of the functional blocks of the control unit 100 of the liquid discharge apparatus 1 according to the present embodiment.

The operations and a configuration of the functional blocks of the control unit 100 of the liquid discharge apparatus 1 according to the present embodiment are described with reference to FIG. 10.

As illustrated in FIG. 10, the control unit 100 of the liquid discharge apparatus 1 according to the present embodiment includes a master setting unit 201, an acquisition unit 202, an image processing unit 203, and an output unit 204.

The master setting unit 201 is a functional unit that adjusts the dithering to achieve masking, which is used in the halftone processing in the image processing that is performed by the acquisition unit 202 as will be described later in detail. By performing the halftone processing and the dithering to achieve masking determined by the master setting unit 201, the dot data or print data with which the above-described continuous discharge control and overstriking control are achieved can be generated. The masking processes in which the dithering to achieve masking is adjusted by the master setting unit 201 are described later in detail with reference to FIG. 15, FIG. 16A, FIG. 16B, FIG. 17A, FIG. 17B, FIG. 18A, FIG. 18B, FIG. 19A, and FIG. 19B.

The acquisition unit 202 is a functional unit that obtains a print job including the image data from the host 170 such as a client personal computer (PC) through the host interface (I/F) 109. The acquisition unit 202 outputs the image data included in the obtained print job to the image processing unit 203.

The image processing unit 203 according to the present embodiment is a functional unit that performs image processing to convert the image data output from the acquisition unit 202 into dot data or dot patterns with which printing is to be performed. The image processing unit 203 performs the dithering to achieve masking determined by the master setting unit 201 in the halftone processing, which is a part of the image processing. The image processing unit 203 outputs the dot data generated by the image processing to the output unit 204. The image processing to be performed by the image processing unit 203 is described later in detail with reference to FIG. 11.

The output unit 204 is a functional unit that outputs the dot data output from the image processing unit 203 to the print controller 106 and the motor driving unit 107.

For example, the master setting unit 201, the acquisition unit 202, the image processing unit 203, and the output unit 204 as described above are implemented as the CPU 101 as illustrated in FIG. 4 executes a program. Some of or all of those functional units may be implemented by hardware circuitry (integrated circuit (IC)) such as a field-programmable gate array (FPGA) or an application specific integrated circuit (ASIC), in place of a software program.

The functional units of the control unit 100 of the liquid discharge apparatus 1 illustrated in FIG. 10 merely indicate functions schematically, and no limitation is intended by such configurations. For example, a plurality of functional units that are illustrated as independent functional units in the control unit 100 of the liquid discharge apparatus 1 as illustrated in FIG. 10 may be configured as a single functional unit. Alternatively, the function of a single functional unit of the control unit 100 of the liquid discharge apparatus 1 as illustrated in FIG. 10 may be divided into a plurality of functions implemented by a plurality of functional units.

A functional unit that controls the print controller 106 and a functional unit that controls the motor driving unit 107 may be realized by executing a program, or the print controller 106 and the motor driving unit 107 themselves may be realized by executing a program.

Figure 11:
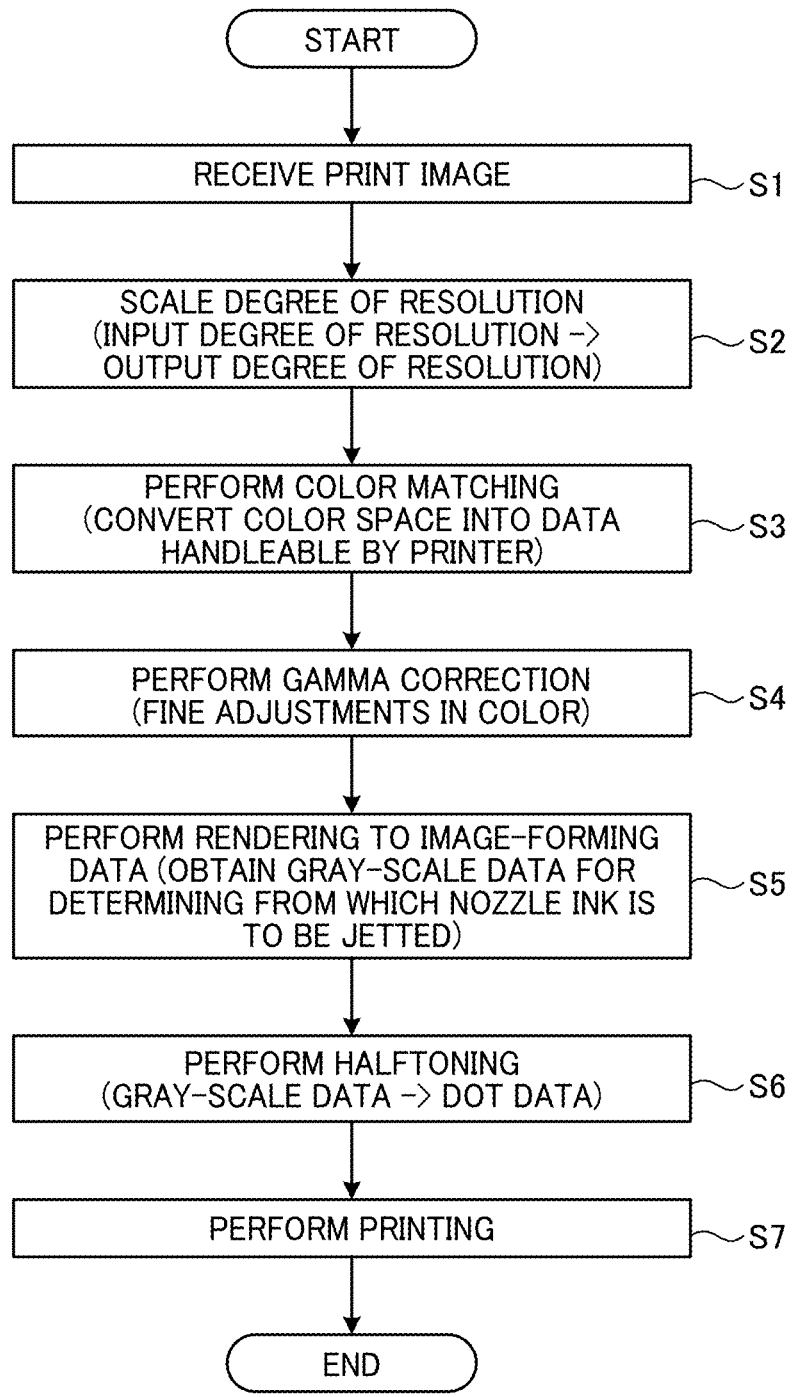
FIG. 11 is a flowchart of the image processing and print processing of a liquid discharge apparatus according to an embodiment of the present disclosure.
Figure 13A:
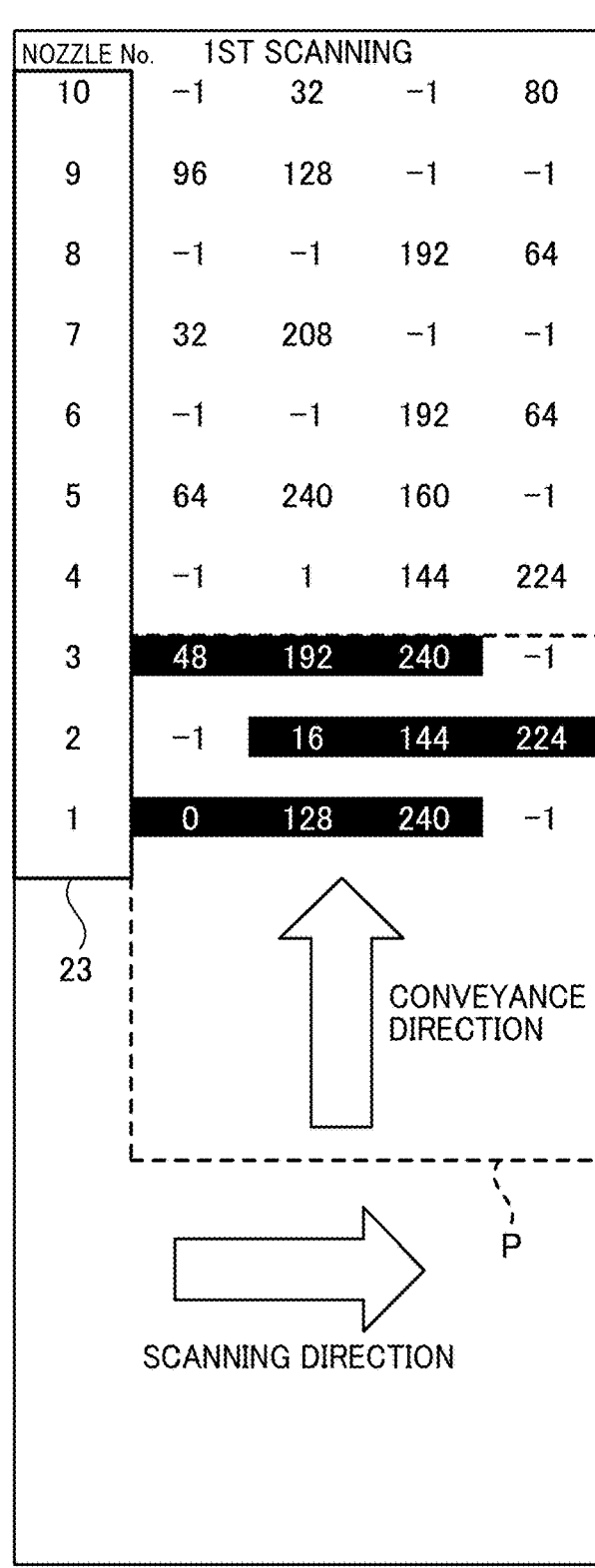
Figure 13C:
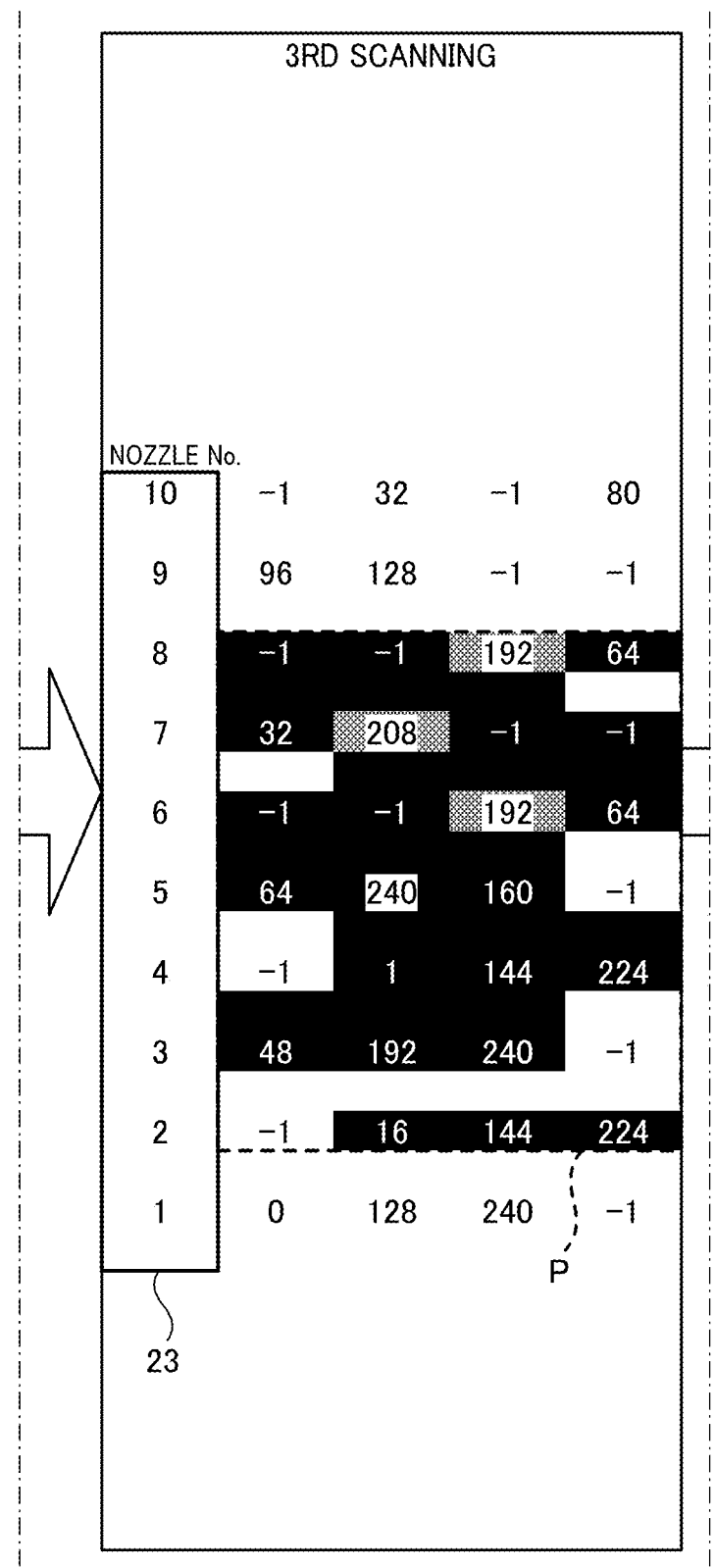
Figure 13D:
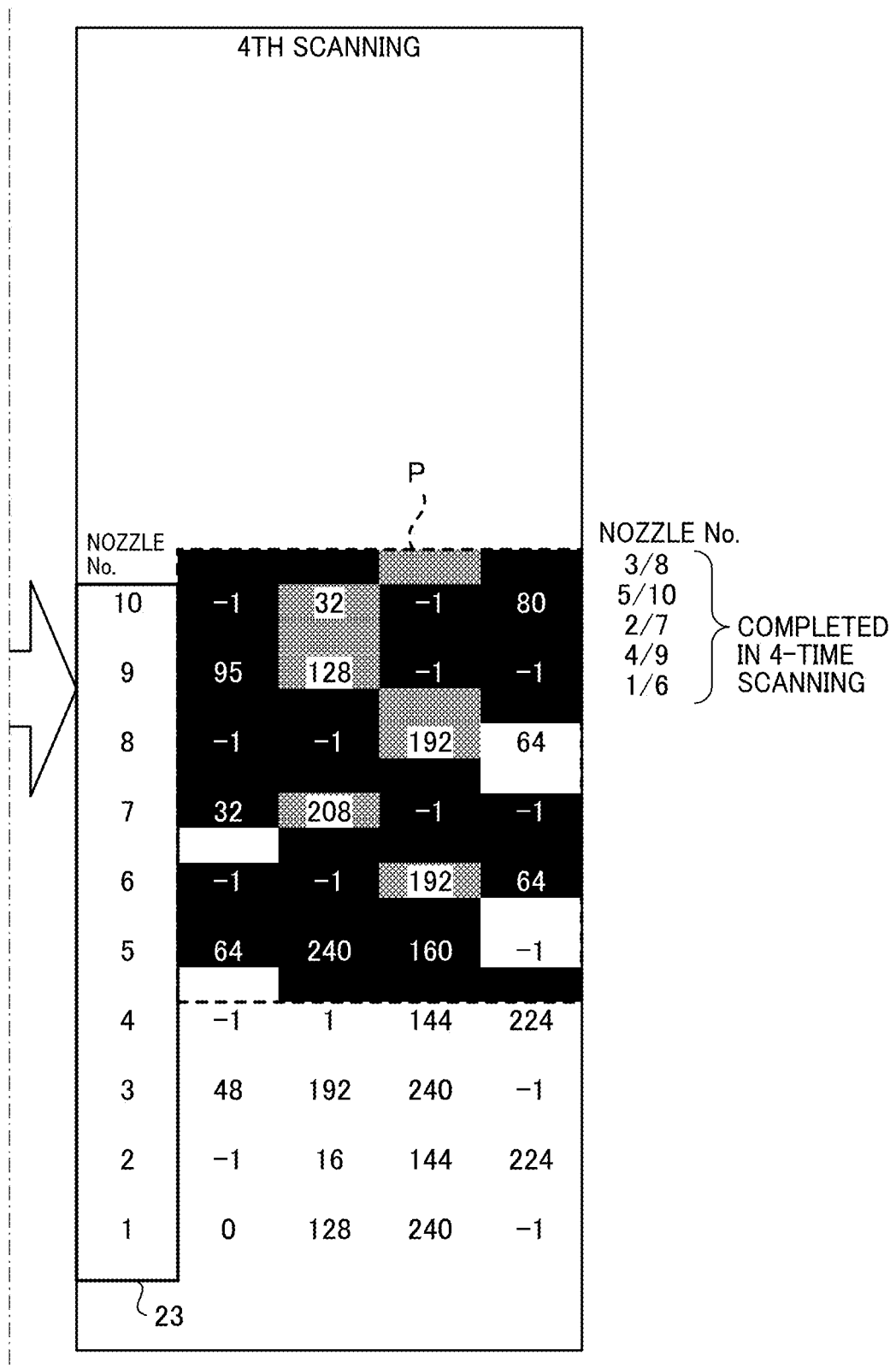
Figure 14A:
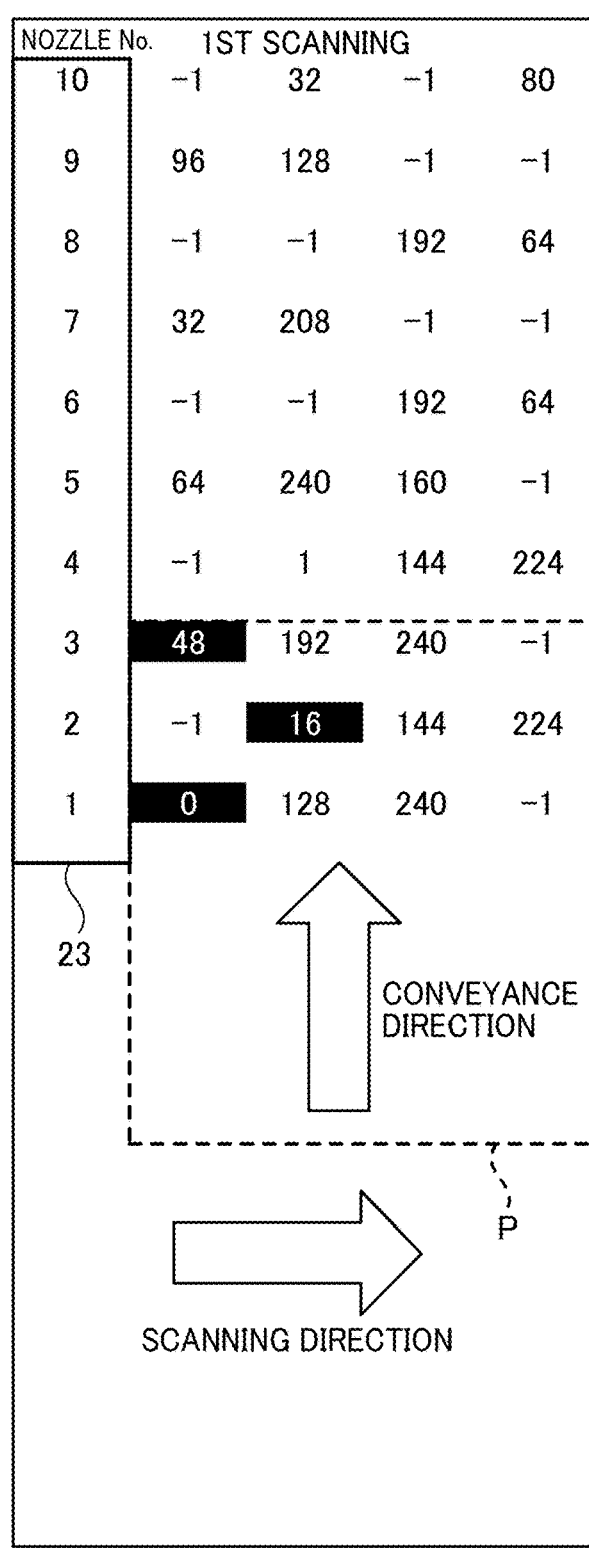
Figure 14C:
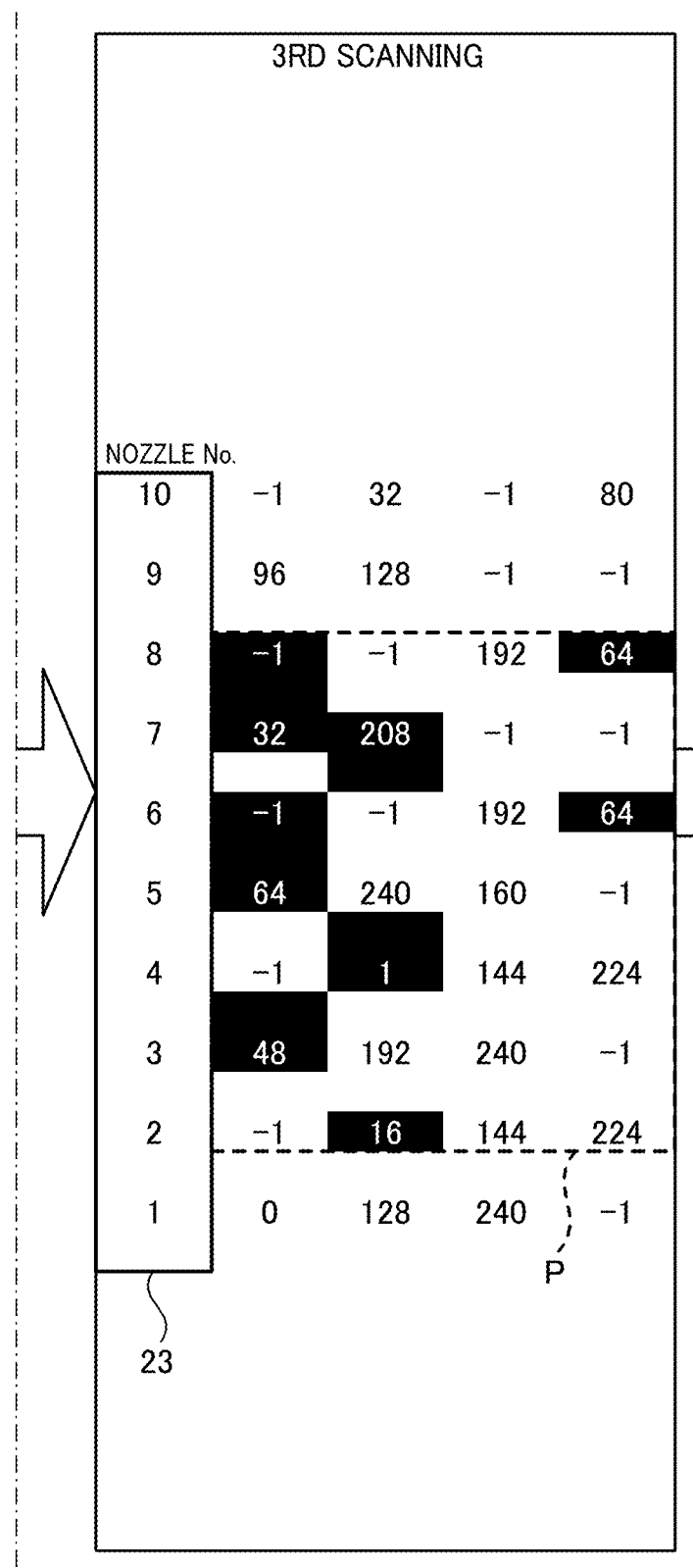
Figure 14D:
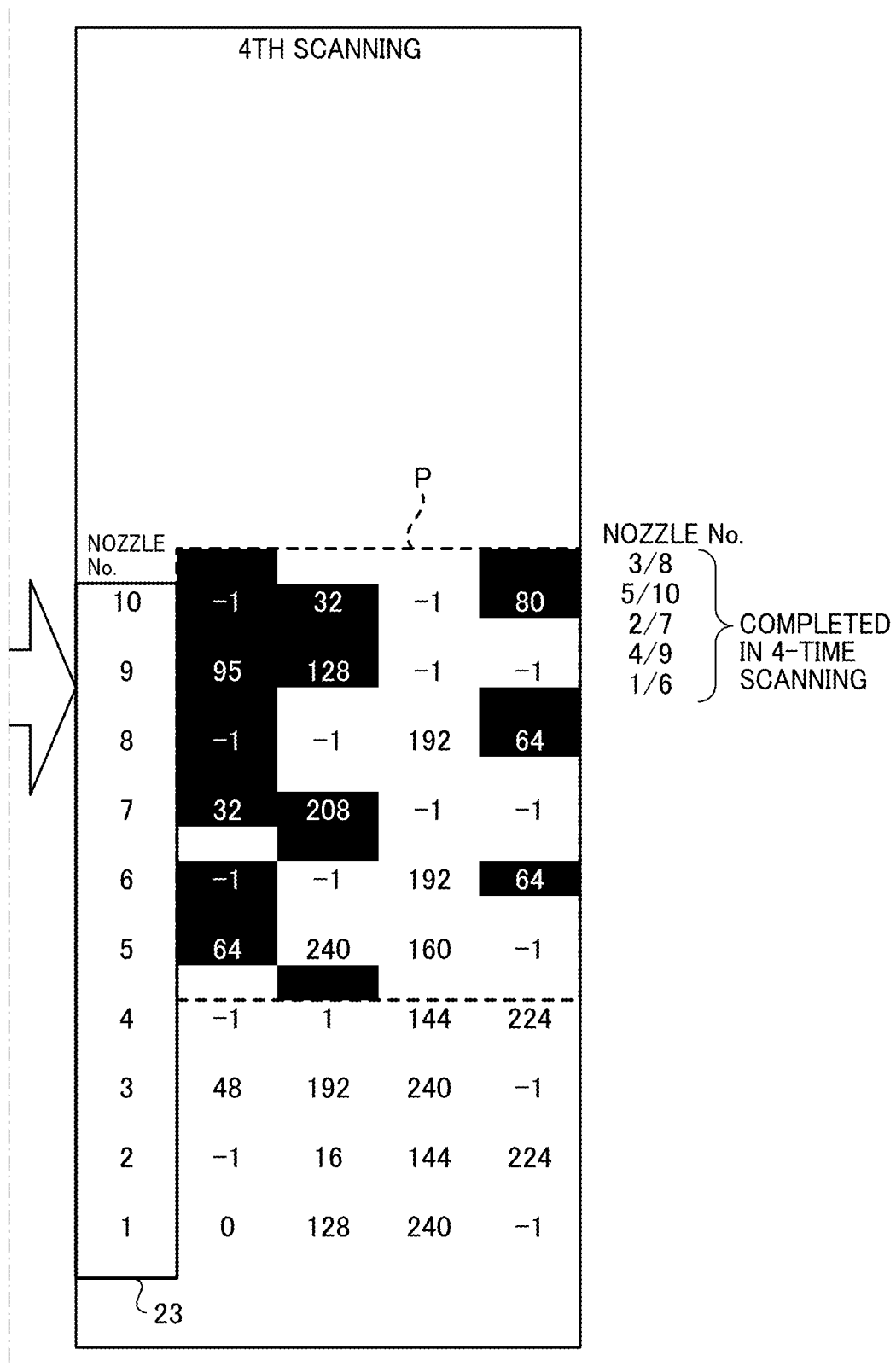

FIG. 11 is a flowchart of the image processing and print processing of the liquid discharge apparatus 1 according to the present embodiment.

FIG. 12 is a diagram illustrating the dithering to achieve masking, which is used in the halftone processing performed by the liquid discharge apparatus 1 according to the present embodiment.

FIG. 13A, FIG. 13B, FIG. 13C, and FIG. 13D are diagrams each illustrating the printing processes based on the image data of 100% grayscale in the liquid discharge apparatus 1, according to the present embodiment.

FIG. 14A, FIG. 14B, FIG. 14C, and FIG. 14D are diagrams each illustrating the printing processes based on the image data of 50% grayscale in the liquid discharge apparatus 1, according to the present embodiment.

The image processing and print processing of the liquid discharge apparatus 1 according to the present embodiment are described below with reference to FIG. 12, FIG. 13A, FIG. 13B, FIG. 13C, FIG. 13D, FIG. 14A, FIG. 14B, FIG. 14C, and FIG. 14D. It is assumed that, for example, the dithering to achieve masking as illustrated in FIG. 12 is designed in advance by the master setting unit 201 as the dithering to achieve masking used to achieve the above-described continuous discharge control and overstriking control.

Step S1

The acquisition unit 202 of the control unit 100 of the liquid discharge apparatus 1 is a functional unit used to receive or obtain a print job including the image data or print image from the host 170 such as a client personal computer (PC) through the host interface (I/F) 109. In the present embodiment, the image data that is obtained by the acquisition unit 202 is, for example, the red, green, and blue (RGB) color data of sRGB or AdobeRGB. The acquisition unit 202 outputs the image data included in the obtained print job to the image processing unit 203. Then, the process shifts to the processes in a step S2.

Step S2

The image processing unit 203 changes the degree of resolution of the image data received from the acquisition unit 202 to a degree of resolution appropriate to the liquid discharge apparatus 1. For example, the image processing unit 203 changes the degree of resolution of the image data from 72 dots per inch (dpi) to 600, 1200, or 2400 dpi by the image resolution scaling processing. Then, the process shifts to the processes in a step S3.

Step S3

The image processing unit 203 according to the present embodiment converts the image data or RGB data whose degree of resolution has been changed into the cyan, magenta, yellow, and black (CMYK) data or cyan, magenta, yellow, black, orange and green (CMYKOG) data of the color space that can be handled by the print controller 106. Such conversion may be referred to as color matching in the following description. By performing the above color matching, color can be reproduced in a normalized manner even when a printer or a recording medium with different color reproducibility is used. Then, the process shifts to the processes in a step S4.

Step S4

The image processing unit 203 according to the present embodiment performs fine adjustments or tone correction in color on the CMYK data or the CMYKOG data obtained as a result of the above color matching depending on the output characteristics of the head driver 140 and the multiple liquid discharge heads 23. Such fine adjustments or tone correction in color may be referred to as gamma correction or gamma adjustment. The data that is generated as a result of the above gamma correction or gamma adjustment may be referred to as cyan, magenta, yellow, and black (CMYK) data or cyan, magenta, yellow, black, orange, and green (CMYKOG) data in the following description. Then, the process shifts to the processes in a step S5.

Step S5

The image processing unit 203 according to the present embodiment converts the CMYK data or CMYKOG data obtained as a result of the above gamma correction or gamma adjustment into gray-scale data used to determine how the multiple liquid discharge heads 23 and the recording medium P are to be moved and from which nozzle the ink is to be discharged. Such conversion may be referred to as renderings for image formation in the following description. Then, the process shifts to the processes in a step S6.

Step S6

The image processing unit 203 according to the present embodiment converts the gray-scale data obtained as a result of the above renderings for image formation into dot data based on the dithering to achieve masking determined by the master setting unit 201. For example, the image processing unit 203 converts the gray-scale data into dot data based on the dithering to achieve masking as illustrated in FIG. 12. Such conversion from gray-scale data into dot data may be referred to as halftone processing in the following description. For example, the image processing unit 203 performs the halftone processing to convert gray-scale data of 8 to 16 bits into quantized dot data of 1 to 2 bits. The image processing unit 203 outputs the dot data generated by the halftone processing to the output unit 204. Then, the process shifts to the processes in a step S7.

Step S7

The output unit 204 is a functional unit that outputs the dot data output from the image processing unit 203 to the print controller 106 and the motor driving unit 107. The print controller 106 according to the present embodiment serves as a control circuit that control the discharging operation of each one of the multiple liquid discharge heads 23 through the head driver 140 based on the dot data output from the output unit 204. The motor driver 107 according to the present embodiment uses the dot data to control the movement of the carriage 15 provided with the multiple liquid discharge heads 23 in the main scanning direction. As a result, the conveyance of the recording medium P is controlled in the sub-scanning direction.

The printing processes that are performed on the recording medium P based on the dot data obtained by the image processing including the halftone process, using the dithering to achieve masking illustrated in FIG. 12, are described below. In the matrix that indicates the dithering to achieve masking as depicted in FIG. 12, "−1" indicates an unassigned flag. As the printing conditions of the liquid discharge apparatus 1 according to the present embodiment, for example, a method in which ½ interlaced scan and dual paths are adopted and an image is formed by performing scanning four times.

In the present embodiment, the halftone processing is performed using the dithering to achieve masking as illustrated in FIG. 12 when the image data of 100% grayscale is input, and printing is performed based on the dot data obtained as a result of the halftone processing. In the present embodiment, 100% grayscale indicates the grayscale on the shadow side, and the gray-scale value is specified to be 255. The processes according to the present embodiment are described in detail with reference to FIG. 13A, FIG. 13B, FIG. 13C, and FIG. 13D. Each one of the liquid discharge heads 23 includes rows of ten nozzles numbered from No. 1 to No. 10. Firstly, in the first scanning, the threshold for the dithering to achieve masking that corresponds to each one of the nozzles Nos. 1, 2, and 3 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. In the present embodiment described with reference to FIG. 13A, FIG. 13B, FIG. 13C, and FIG. 13D, as a result of the above-described continuous discharge control, as illustrated in FIG. 13A, FIG. 13B, FIG. 13C, and FIG. 13D, a portion where ink dots are continuously discharged in the same line is formed for the gray-scale printing on the shadow side. After the ink is discharged in the first scanning, the recording medium P is conveyed by five pixels in the conveyance direction parallel to the sub-scanning direction according to a method in which ½ interlaced scan and dual paths are adopted.

Subsequently, in the second scanning, the threshold for the dithering to achieve masking that corresponds to each one of the nozzles Nos. 1, 2, 3, 4, and 5 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. After the inks are discharged in the second scanning, in a similar manner to the above, the recording medium P is conveyed by five pixels in the conveyance direction parallel to the sub-scanning direction.

Subsequently, in the third scanning, the threshold for the dithering to achieve masking that corresponds to each one of the nozzles Nos. 2, 3, 4, 5, 6, 7, and 8 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. In the present embodiment described with reference to FIG. 13A, FIG. 13B, FIG. 13C, and FIG. 13D, as a result of the above-described overstriking control, as illustrated in FIG. 13A, FIG. 13B, FIG. 13C, and FIG. 13D, a portion where ink dots are superimposed on top of one another at the same position when the inks are discharged is formed for the gray-scale printing on the shadow side. In other words, the hatched areas in FIG. 13A, FIG. 13B, FIG. 13C, and FIG. 13D are formed. After the inks are discharged in the third scanning, in a similar manner to the above, the recording medium P is conveyed by five pixels in the conveyance direction parallel to the sub-scanning direction.

Subsequently, in the fourth scanning, the threshold for the dithering to achieve masking that corresponds to each one of the nozzles Nos. 5, 6, 7, 8, 9, and 10 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. As described above, the formation of an image in five lines is completed on the recording medium P by performing scanning four times as in the first scanning to the fourth scanning. In a similar manner to the above, images are further formed as inks are discharged onto the recording medium P. As a result, as illustrated in FIG. 13A, FIG. 13B, FIG. 13C, and FIG. 13D, the ratio of a portion where ink dots are continuously discharged and a portion where ink dots are superimposed on top of one another at the same position when the inks are discharged is greater on the gray-scale image data on the shadow side than those on the highlight side as a result of the continuous discharge control and the overstriking control. As a result, the resistance to the banding can be increased.

In the present embodiment, when the image data of 50% grayscale is input, the halftone processing is performed using the dithering to achieve masking as illustrated in FIG. 12. In the present embodiment, 50% grayscale indicates the grayscale in the middle between the shadow side and the highlight side, and the gray-scale value is specified to be 128. Then, printing is performed based on the dot data obtained as a result of the halftone processing. Such operations are described below in detail with reference to FIG. 14A, FIG. 14B, FIG. 14C, and FIG. 14D. Firstly, in the first scanning, the threshold for the dithering to achieve masking that corresponds to each one of the nozzles Nos. 1, 2, and 3 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. In the present embodiment described with reference to FIG. 14A, FIG. 14B, FIG. 14C, and FIG. 14D, for the gray-scale printing in the middle between the shadow side and the highlight side, as illustrated in FIG. 14A, FIG. 14B, FIG. 14C, and FIG. 14D, even at this point in time, a portion where ink dots are continuously discharged in the same line is not formed. After the ink is discharged in the first scanning, the recording medium P is conveyed by five pixels in the conveyance direction parallel to the sub-scanning direction according to a method in which ½ interlaced scan and dual paths are adopted.

Subsequently, in the second scanning, the threshold for the dithering to achieve masking that corresponds to each one of the nozzles Nos. 1, 2, 3, 4, and 5 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. As illustrated in FIG. 14A, FIG. 14B, FIG. 14C, and FIG. 14D, even at this point in time, a portion where ink dots are continuously discharged in the same line is not formed. After the inks are discharged in the second scanning, in a similar manner to the above, the recording medium P is conveyed by five pixels in the conveyance direction parallel to the sub-scanning direction.

Subsequently, in the third scanning, the threshold for the dithering to achieve masking that corresponds to each one of the nozzles Nos. 2, 3, 4, 5, 6, 7, and 8 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. As illustrated in FIG. 14A, FIG. 14B, FIG. 14C, and FIG. 14D, at this point in time, a portion where ink dots are continuously discharged in the same line is formed (see the positions of threshold values "32" and "208" of nozzle No. 7). After the inks are discharged in the third scanning, in a similar manner to the above, the recording medium P is conveyed by five pixels in the conveyance direction parallel to the sub-scanning direction.

Subsequently, in the fourth scanning, the threshold for the dithering to achieve masking that corresponds to each one of the nozzles Nos. 5, 6, 7, 8, 9, and 10 is compared with the gray-scale value of the image data in the line corresponding to each one of the multiple nozzles, and inks are discharged from the specified ones of the multiple nozzles while the multiple liquid discharge heads 23 are moving to a position where the gray-scale value is greater than the threshold in that line in the scanning direction of the heads parallel to the main scanning direction. As described above, the formation of an image in five lines is completed on the recording medium P by performing scanning four times as in the first scanning to the fourth scanning. Subsequently, images are formed as inks are discharged onto the recording medium P in a similar manner to the above. As illustrated in FIG. 14A, FIG. 14B, FIG. 14C, and FIG. 14D, the number of portions where ink dots are continuously discharged in the same line is increased at this point in time compared with the situation at the time of the third scanning. However, the number of portions where ink dots are continuously discharged is small compared with the cases as described above with reference to FIG. 13A, FIG. 13B, FIG. 13C, and FIG. 13D. As illustrated in FIG. 14A, FIG. 14B, FIG. 14C, and FIG. 14D, for the gray-scale printing in the middle between the shadow side and the highlight side, even at this point in time, a portion where ink dots are superimposed on top of one another at the same position when the inks are discharged is not formed.

As described above, in the present embodiment, the continuous discharge control and the overstriking control are performed depending on the grayscale of the input print image or image data. Due to such a configuration, a desired degree of granularity is achieved on the highlight side and the resistance to the banding improves on the shadow side.

Figure 15:
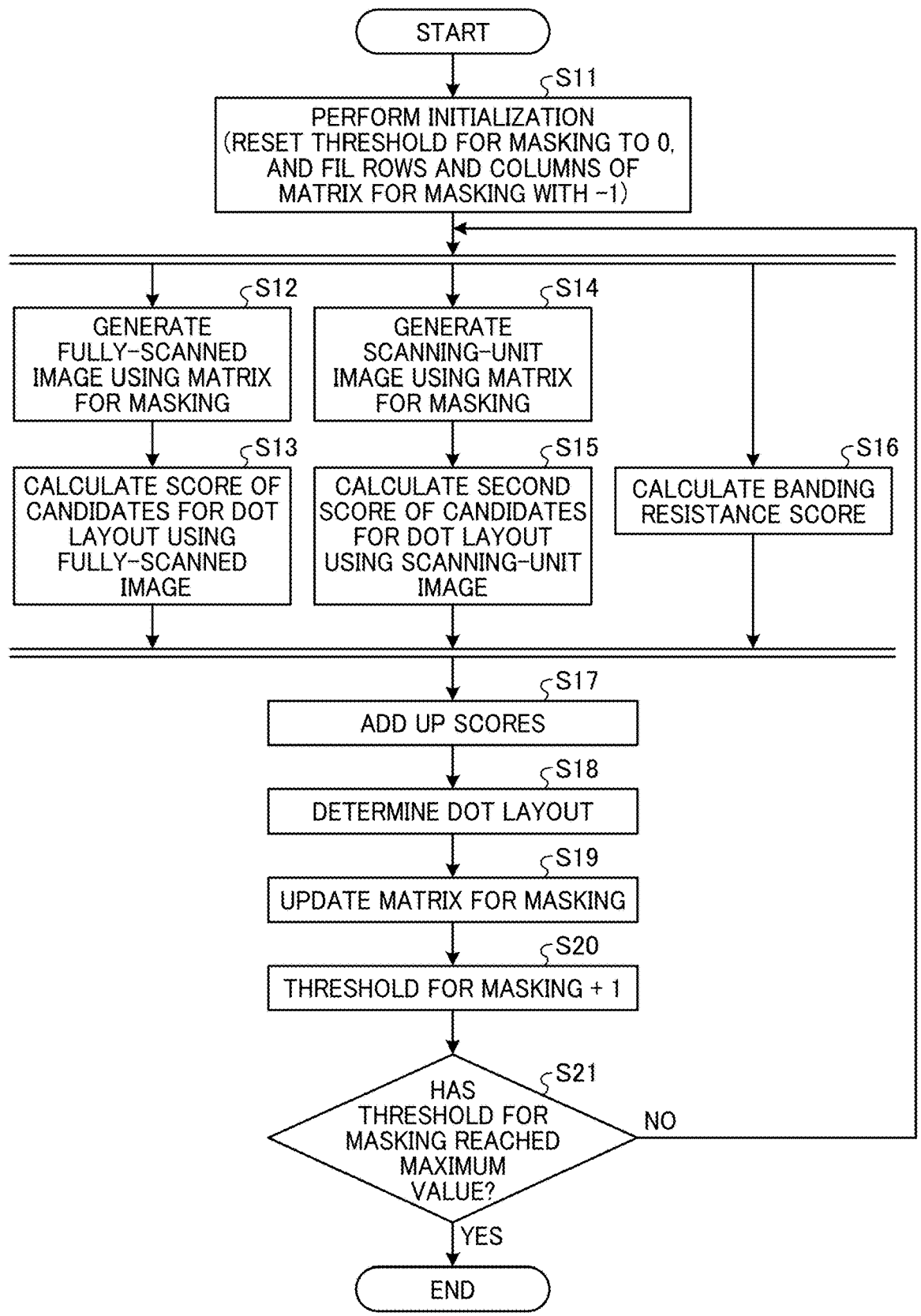
FIG. 15 is a flowchart of the masking processes to be performed by a liquid discharge apparatus according to an embodiment of the present disclosure.

FIG. 15 is a flowchart of the masking processes to be performed by the liquid discharge apparatus 1 according to the present embodiment.

Figure 16B:
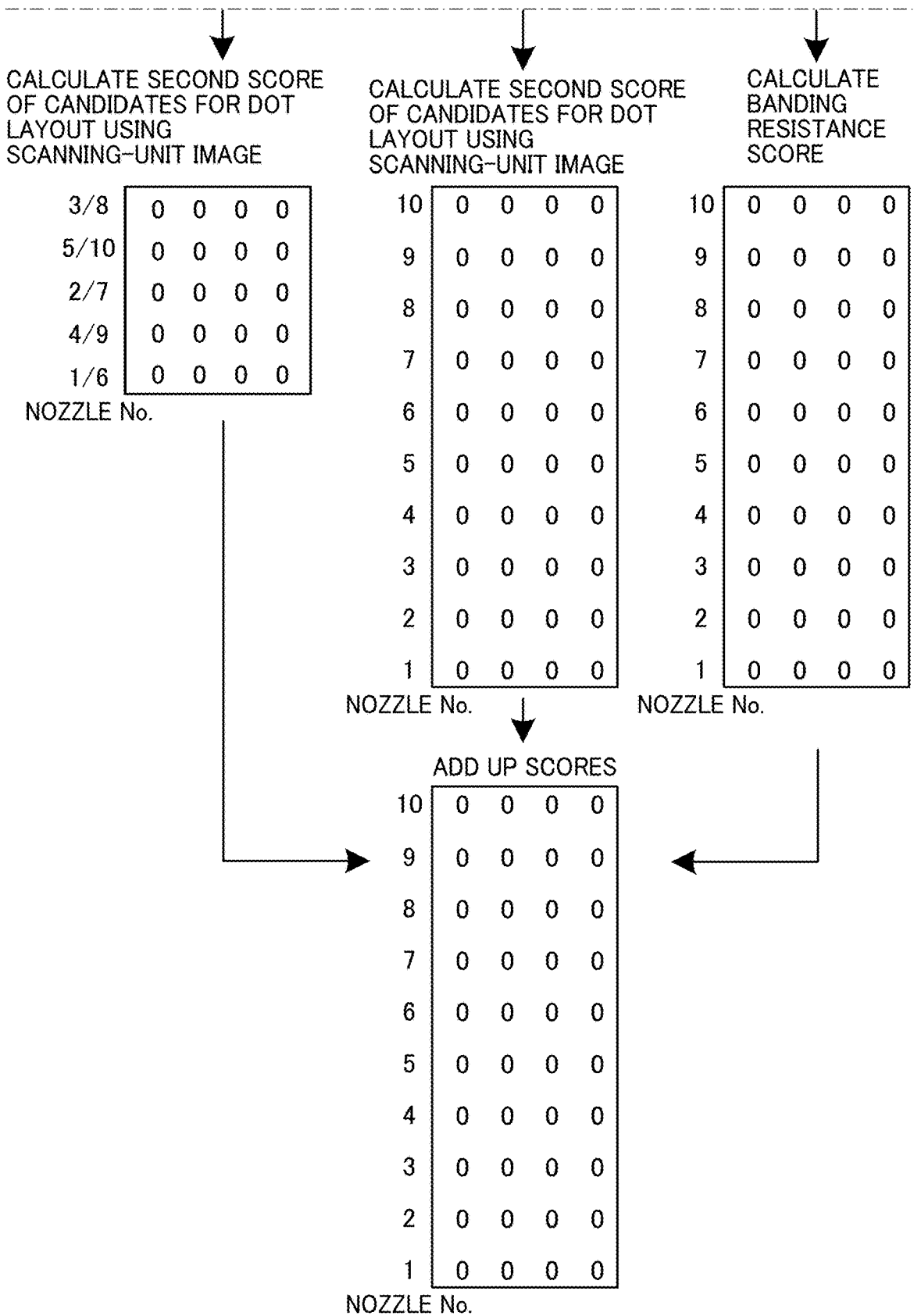

FIG. 16A and FIG. 16B are diagrams each illustrating how the masking processes are repeated in the first loop in the liquid discharge apparatus 1 according to the present embodiment.

Figure 17B:
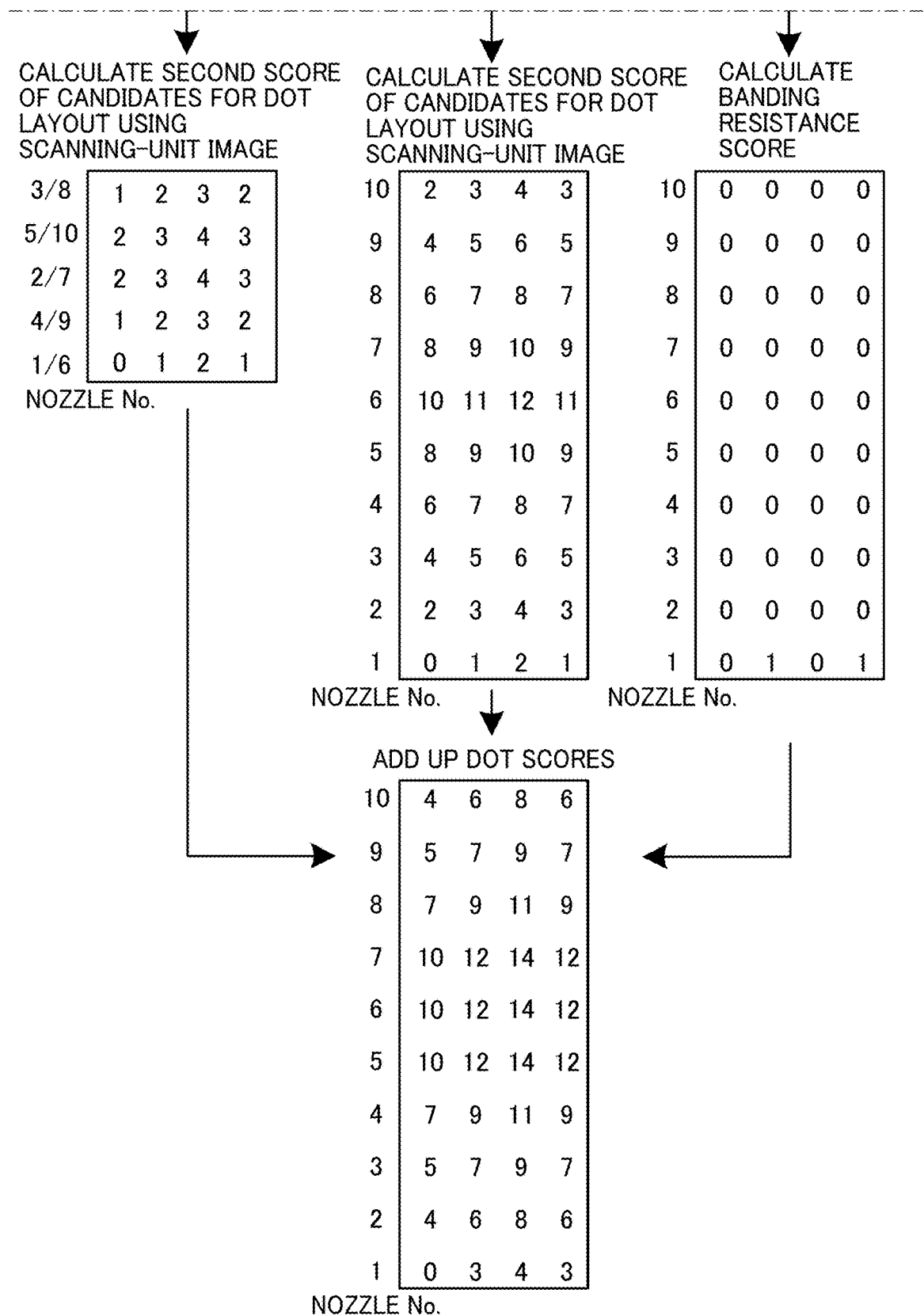

FIG. 17A and FIG. 17B are diagrams each illustrating how masking processes are repeated in the second loop in the liquid discharge apparatus 1 according to the present embodiment.

Figure 18B:
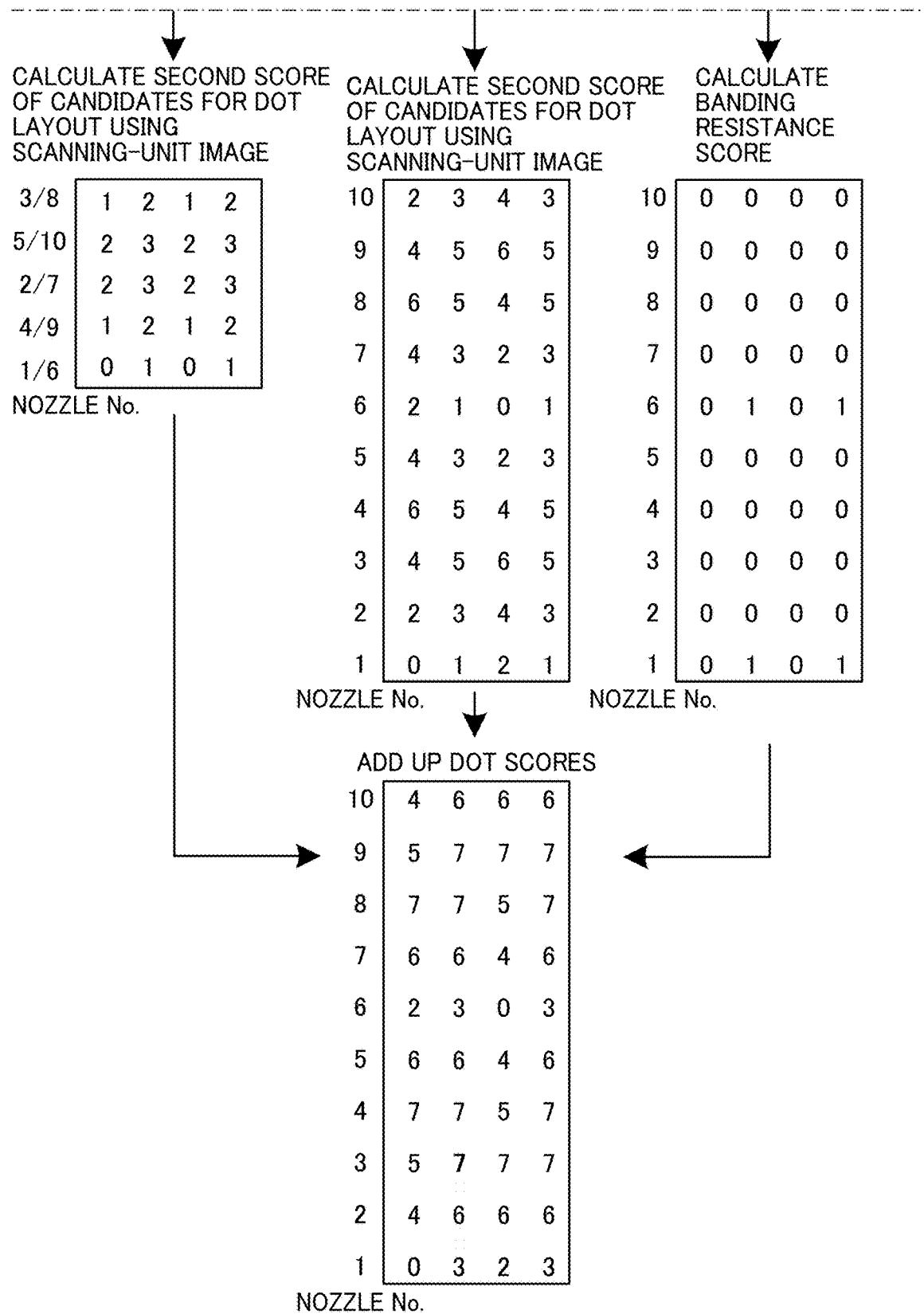

FIG. 18A and FIG. 18B are diagrams each illustrating how masking processes are repeated in the third loop in the liquid discharge apparatus 1 according to the present embodiment.

Figure 19B:
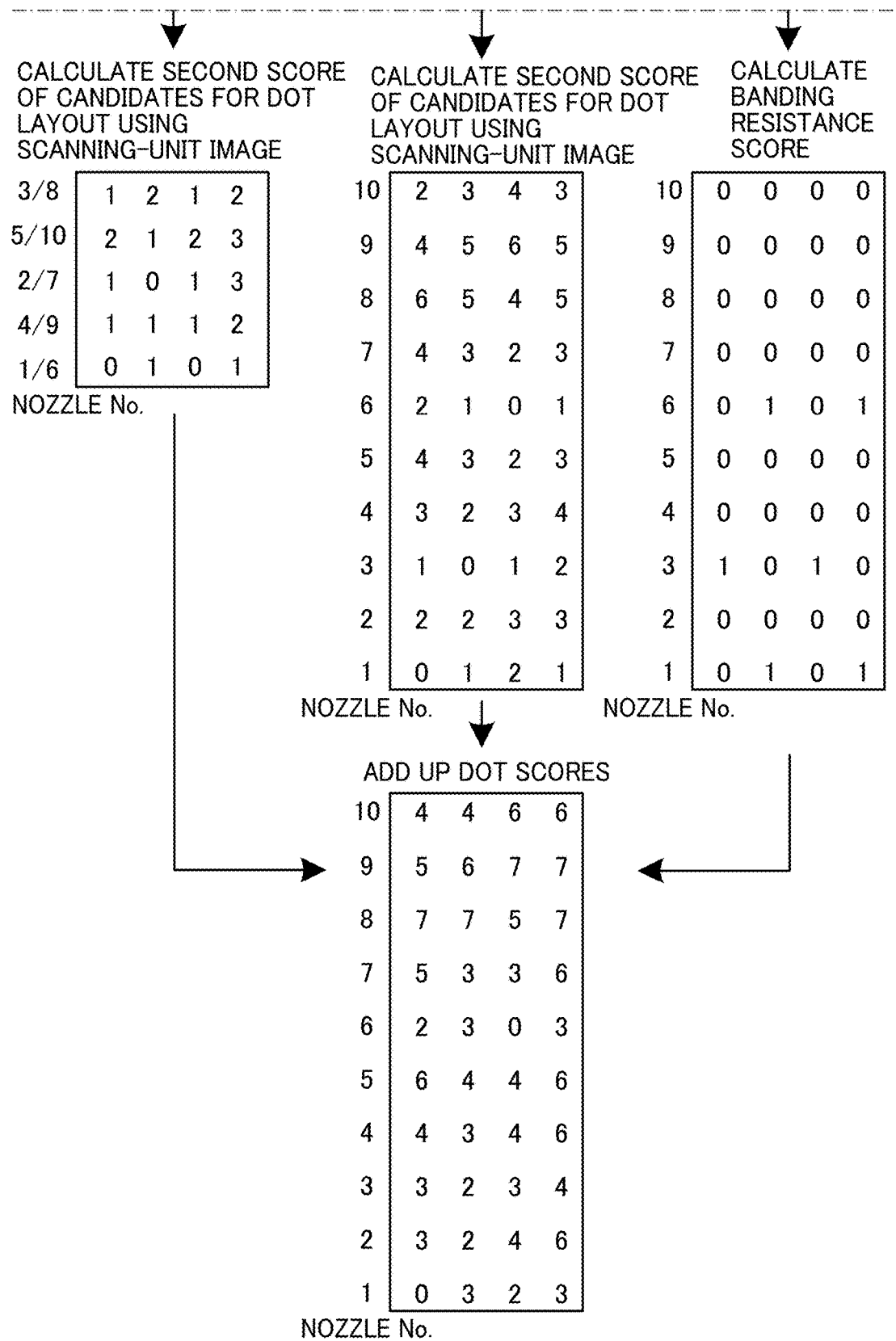

FIG. 19A and FIG. 19B are diagrams each illustrating how masking processes are repeated in the fourth loop in the liquid discharge apparatus 1 according to the present embodiment.

With reference to FIG. 15, FIG. 16A, FIG. 16B, FIG. 17A, FIG. 17B, FIG. 18A, FIG. 18B, FIG. 19A, and FIG. 19B, the flow of the masking processes are described below. Such masking processes are performed to adjust the dithering to achieve masking used in the halftone processing with which the print processing using the above-described continuous discharge control and overstriking control are achieved in the liquid discharge apparatus 1 according to the present embodiment. In the present embodiment, as illustrated in FIG. 16A and FIG. 16B, the processes of adjusting the dithering to achieve masking based on the matrix for masking with the horizontal and vertical aspect ratio of 4 to 10 in size are described.

Step S11

The master setting unit 201 of the control unit 100 of the liquid discharge apparatus 1 initializes the matrix for masking to adjust the dithering to achieve masking. More specifically, as illustrated in FIG. 16A and FIG. 16B, the master setting unit 201 resets the threshold for masking used to assign thresholds to the components of the matrix for masking to 0, and changes the value of each one of the cells of the rows and columns of the matrix for masking to "−1" that indicates an unassigned flag. Then, the process shifts to the processes in a step S12, a step S14, and a step S16.

Step S12

The master setting unit 201 generates a fully-scanned image using the matrix for masking. Such a fully-scanned image according to the present embodiment serves as the first image, and is image-sized dot data completed as the multiple liquid discharge heads 23 provided with ten nozzles performs scanning four times using a method in which ½ interlaced scan and dual paths are adopted. More specifically, the dot data is composed of pixels with the horizontal and vertical aspect ratio of 4 to 5, and includes the first line that is printed through dual path including nozzle No. 1 and nozzle No. 6, the second line that is printed through dual path including nozzle No. 4 and nozzle No. 9, the third line that is printed through dual path including nozzle No. 2 and nozzle No. 7, the fourth line that is printed through dual path including nozzle No. 5 and nozzle No. 10, and the fifth line that is printed through dual path including nozzle No. 3 and nozzle No. 8. The master setting unit 201 arranges dots in pixels corresponding to the threshold values assigned to the components of the matrix for masking in the fully-scanned image. By so doing, a fully-scanned image is generated. In the present embodiment described with reference to FIG. 16A and FIG. 16B, all the components of the matrix for masking initialized in the step S11 are set to "−1" that indicates an unassigned flag. Accordingly such a fully-scanned image is the dot data in which no dots are arranged. Then, the process shifts to the processes in a step S13.

Step S13

The master setting unit 201 calculates the first score of the candidates for dot layout using the fully-scanned image. More specifically, the master setting unit 201 calculates, for example, the Manhattan distance from each one of the dots arranged on the fully-scanned image generated in the steps S12 as a score, and arranges the calculated score onto the corresponding pixel in the fully-scanned image. In the present embodiment described with reference to FIG. 16A and FIG. 16B, as no dots are arranged on the fully-scanned image generated in the steps S12, the master setting unit 201 assigns "0" to each one of the multiple pixels of the fully-scanned image as the arranged score. Then, the process shifts to the processes in a step S17.

Step S14

The master setting unit 201 generates a scanning-unit image using the matrix for masking. Such a scanning-unit image generated by the master setting unit 201 serves as the second image. The scanning-unit image according to the present embodiment is an image-sized dot data whose size corresponds to that of the matrix for masking with the horizontal and vertical aspect ratio of 4 to 10. The master setting unit 201 arranges dots in pixels corresponding to the threshold values assigned to the components of the matrix for masking in the scanning-unit image. By so doing, a scanning-unit image is generated. In the present embodiment described with reference to FIG. 16A and FIG. 16B, all the components of the matrix for masking initialized in the step S11 are set to "−1" that indicates an unassigned flag. Accordingly such a scanning-unit image is the dot data in which no dots are arranged. Then, the process shifts to the processes in a step S15.

Step S15

The master setting unit 201 calculates the second score of the candidates for dot layout using the generated scanning-unit image. More specifically, the master setting unit 201 calculates, for example, the Manhattan distance from each one of the dots arranged on the scanning-unit image generated in the steps S14 as a score, and arranges the calculated score onto the corresponding pixel in the scanning-unit image. In the present embodiment described with reference to FIG. 16A and FIG. 16B, as no dots are arranged on the scanning-unit image generated in the steps S14, the master setting unit 201 assigns "0" to each one of the multiple pixels of the scanning-unit image as the arranged score.

Then, the process shifts to the processes in a step S17.

Step S16

The master setting unit 201 uses the matrix for masking to calculate the third score indicating the resistance to the banding. More specifically, in the third image having the same size as the scanning-unit image, the master setting unit 201 assigns "1" as the score to the pixels adjacent to both sides in the main scanning direction of the pixel corresponding to each one of the thresholds assigned to the components of the matrix for masking, and assigns "0" to the other pixels. The scores to be assigned to both adjacent pixels are not limited to "1," and the scores of other values may be arranged. Then, the process shifts to the processes in a step S17.

In other words, the processes in the step S12 and the step S13, the processes in the step S14 and the step S15, and the processes in the step S16 are performed in parallel.

Step S17

The master setting unit 201 adds up the score of the candidates for dot layout based on the fully-scanned image, which is calculated in the step S13, the score of the candidates for dot layout based on the scanning-unit image, which is calculated in the step S15, and the score of the resistance to the banding, which is calculated in the step S16, separately at the corresponding pixel. In the present embodiment described with reference to FIG. 16A and FIG. 16B, the score of the candidates for dot layout based on the fully-scanned image, the score of the candidates for dot layout based on the scanning-unit image, and the score of the resistance to the banding are all 0. Accordingly, all the scores that are added up separately at the corresponding pixel by the master setting unit 201 are 0. Then, the process shifts to the processes in a step S18.

Step S18

The master setting unit 201 determine that the position with the highest score out of all the added-up scores is the position at which the dot is arranged. In the present embodiment described with reference to FIG. 16A and FIG. 16B, as all the added-up scores are 0, the master setting unit 201 determines that the position of any desired pixel is the position at which the dot is to be arranged. In the present embodiment described with reference to FIG. 16A and FIG. 16B, the position of the bottom-left pixel is determined to be the position at which the dot is to be arranged. In regard to the score of the resistance to the banding out of all the added-up scores, which is calculated in the step S16, "1" is assigned as the score to the pixels adjacent to both sides in the main scanning direction of the pixel corresponding to each one of the thresholds. For this reason, as the value of the master threshold is greater, the possibility that a new threshold is given to the neighboring pixels increases. As a result, the frequencies of the dots that are continuously discharged on the shadow side increases, and the frequencies of the dots that are superimposed on top of one another at the same coordinates when ink dots are discharged onto the recording medium P increases. Then, the process shifts to the processes in a step S19.

Step S19

The master setting unit 201 arranges, in the matrix for masking, the threshold for masking in the components corresponding to the positions of the dot layout determined in step the S18. By so doing, the matrix for masking can be updated. In the present embodiment described with reference to FIG. 16A and FIG. 16B, the position of the bottom-left pixel is determined to be the position at which the dot is to be arranged. Accordingly, as illustrated in FIG. 17A and FIG. 17B, the master setting unit 201 assigns the threshold for masking "0" to the components corresponding to the positions of the dot layout in the matrix for masking to update the matrix for masking. Then, the process shifts to the processes in a step S20.

Step S20

The master setting unit 201 increments the current threshold for masking to obtain a new threshold for masking. In the present embodiment described with reference to FIG. 17A and FIG. 17B, the master setting unit 201 assigns the threshold for masking "0" to the components of the matrix for masking in the step S19. Accordingly, the incremented value "1" is used as the new threshold for masking. Then, the process shifts to the processes in a step S21.

Step S21

The master setting unit 201 determines whether the current threshold for masking has reached its peak or the maximum value. When the threshold for masking reaches its peak or the maximum value ("YES" in the step S21), the master setting unit 201 finally assigns the matrix for masking updated by the threshold for masking to the dithering to achieve masking. On the other hand, when the threshold for masking does not reach its peak or the maximum value ("NO" in the step S21), the process returns to the step S12, the step S14, and the step S16.

As described above, after the initialization is performed in the step S11, the processes in the step S12, the step S13, the step S14, the step S15, the step S16, the step S17, the step S18, the step S19, the step S20, and step S21 are repeated. By so doing, the incremented threshold values are given to the cells of the matrix for masking, and the dithering to achieve masking is completed. The operations or processes described as above with reference to FIG. 17A, FIG. 17B, FIG. 18A, FIG. 18B, FIG. 19A, and FIG. 19B indicate how the incremented threshold values are sequentially given to the cells of the matrix for masking as the processes in the step S12, the step S13, the step S14, the step S15, the step S16, the step S17, the step S18, the step S19, the step S20, and step S21 are repeated after a threshold is assigned to the components of the matrix for masking corresponding to the positions of the dot layout determined in FIG. 16A and FIG. 16B. In the step S13 and the step S15, the distance from the arranged dot is used as the score. However, no limitation is intended thereby, and the score may be calculated using, for example, a filter having a high correlation with the granularity. In the score of the resistance to the banding, "1" is assigned as the score to the pixels adjacent to both sides in the main scanning direction of the pixel corresponding to each one of the thresholds assigned to the components of the matrix for masking. However, no limitation is indicated thereby, and the scores may be calculated in view of other various kinds of elements. In the summation of the multiple scores in the step S17, the scores calculated in the step S13, the step S15, and the step S16 are summed up with no change. However, no limitation is intended thereby, and each of the multiple calculated scores may be weighted before those scores are summed up. For example, in the step S12, the step S13, the step S14, the step S15, the step S16, the step S17, the step S18, the step S19, the step S20, and step S21, the weight of the score of the resistance to the banding may be reduced in the highlighting steps where the processes are repeated a few times but not many times and the weight of the score of the resistance to the banding may be increased in the shadowing steps where the processes are repeated relatively many times, and those scores may later be added up. By so doing, the dithering to achieve masking can be adjusted such that the graininess further increases on the highlight side and the resistance to the banding further improves on the shadow side.

As described above, in the liquid discharge apparatus 1 according to the present embodiment, an image in one line in the main scanning direction is formed on the recording medium P as scanning is performed a plurality of times in the main scanning direction and the multiple liquid discharge heads 23 discharge ink from nozzles. The acquisition unit 202 obtains image data to be printed, and the image processing unit 203 according to the present embodiment performs dithering to achieve masking and halftone processing on the image data to generate dot data. The control unit 100 controls the movement of the multiple liquid discharge heads 23 based on the dot data, and controls the discharge of the ink based on the dot data. Moreover, the control unit 100 controls the multiple liquid discharge heads 23 such that the number of ink dots in the grayscale on the shadow side indicated by the dot data, which are continuously discharged onto the recording medium P in the main scanning direction, increases greater than the number of ink dots in the grayscale of highlight indicated by the dot data, and controls the multiple liquid discharge heads 23 such that the number of points at which inks are superimposed on top of one another when the inks are discharged at the same coordinates on the recording medium P in the grayscale of shadow indicated by the dot data increases greater than the number of points at which inks are superimposed on top of one another in the grayscale of highlight indicated by the dot data.

More specifically, the control unit 100 according to the present embodiment performs control such that the ratio of the number of ink dots of the ink continuously discharged onto the recording medium P in the main scanning direction in the grayscale on the shadow side indicated by the dot data to the total number of ink dots of the ink discharged onto the recording medium P in the one-time scanning by the liquid discharge head 23 in one line in the main scanning direction is increased to be greater than the ratio of the number of ink dots of the ink continuously discharged onto the recording medium P in the main scanning direction in the grayscale on the highlight side indicated by the dot data to the total number of ink dots of the ink discharged onto the recording medium P in the one-time scanning by the liquid discharge head 23 in one line in the main scanning direction. Moreover, the control unit 100 according to the present embodiment performs control such that the ratio of the number of points at which ink dots of the ink are superimposed on top of one another in the grayscale on the shadow side indicated by the dot data to all points on the recording medium P in one line in the main scanning direction when the ink is discharged at the same coordinates on the recording medium P in a one-time scanning and another one-time scanning performed by the liquid discharge head 23 is increased to be greater than the ratio of the number of points at which ink dots of the ink are superimposed on top of one another in the grayscale on the highlight side indicated by the dot data to all points on the recording medium P in one line in the main scanning direction when the ink is discharged at the same coordinates on the recording medium P in the one-time scanning and the other one-time scanning performed by the liquid discharge head 23. As described above, in the present embodiment, control is performed depending on the grayscale of the input print image or image data. Due to such a configuration, a desired degree of granularity is achieved on the highlight side, and the resistance to the banding can be increased on the shadow side. In other words, halftone in which both graininess and resistance to the banding are achieved can be implemented.

The multiple functions according to the above embodiments of the present disclosure can be implemented by one or a plurality of processing circuits. The processing circuit herein includes, for example, devices such as a processor that is programmed to execute software to implement functions, like a processor with electronic circuits, an application specific integrated circuit (ASIC), a digital signal processor (DSP), a field-programmable gate array (FPGA), a system on a chip (SoC), a graphics processing unit (GPU) that are designed to execute the above functions, and a circuit module known in the art.

In the embodiments of the present disclosure, when at least some of the multiple functional units of the liquid discharge apparatus 1 is implemented by executing a program, such a program may be incorporated in advance in a read-only memory (ROM) or the like. A program to be executed by the liquid discharge apparatus 1 according to the embodiments of the present disclosure and their modification may be installed for distribution in any desired computer-readable recording medium such as a compact disc, a read-only memory (CD-ROM), a flexible disk (FD), a compact disc-recordable (CD-R), a digital versatile disk (DVD), or a secure digital (SD) card in a file format installable or executable by a computer. A program to be executed by the liquid discharge apparatus 1 according to the above embodiments of the present disclosure may be stored in a computer connected to a network such as the Internet, and may be downloaded through the network. Alternatively, a program to be executed by the liquid discharge apparatus 1 according to the above embodiments of the present disclosure may be provided or distributed through a network such as the Internet. A program to be executed by the liquid discharge apparatus 1 according to the above embodiments of the present disclosure and their modification has module structure including at least one of the above-described functional units. Regarding the actual hardware related to the program, the CPU reads and executes the program from the memory as described above to load the program onto the main memory to implement the above multiple functional units.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A liquid discharge apparatus comprising circuitry configured to
obtain image data to be printed,
perform dithering to achieve masking and halftone processing on the image data to generate print data, and
control movement of a discharge head and control discharge of ink based on the print data to
increase a ratio of a number of ink dots of the ink continuously discharged onto a recording medium in a main scanning direction in a grayscale on a shadow side indicated by the print data to a total number of ink dots of the ink discharged onto the recording medium in one-time scanning by the discharge head in one line in the main scanning direction to be greater than a ratio of a number of ink dots of the ink continuously discharged onto the recording medium in the main scanning direction in a grayscale on a highlight side indicated by the print data to the total number of ink dots of the ink discharged onto the recording medium in the one-time scanning by the discharge head in the one line in the main scanning direction and
increase a ratio of a number of points at which ink dots of the ink are superimposed on top of one another in the grayscale on the shadow side indicated by the print data to all points on the recording medium in the one line in the main scanning direction when the ink is discharged at same coordinates on the recording medium in a one-time scanning and another one-time scanning performed by the discharge head to be greater than a ratio of a number of points at which ink dots of the ink are superimposed on top of one another in the grayscale on the highlight side indicated by the print data to all points on the recording medium in the one line in the main scanning direction when the ink is discharged at same coordinates on the recording medium in the one-time scanning and the another one-time scanning performed by the discharge head.

2. The liquid discharge apparatus according to claim 1, wherein the circuitry is configured to set the dithering to achieve masking to control the discharge head.

3. The liquid discharge apparatus according to claim 2, wherein the circuitry is configured to
calculate, as a first score, a distance from a plurality of pixels corresponding to a plurality of thresholds assigned to a matrix for masking to a plurality of other pixels, in a first image having an image size of an image completed by scanning of the discharge head,
calculate, as a second score, the distance from the plurality of pixels corresponding to the plurality of thresholds assigned to the matrix for masking to the plurality of other pixels, in a second image having an image size corresponding to a size of the matrix for masking,
assign a prescribed value as a third score to a pair of pixels adjacent to both sides in the main scanning direction of the plurality of pixels corresponding to the plurality of thresholds assigned to the matrix for masking, in a third image having a same size as the second image,
assign 0 as the third score to pixels other than the pair of pixels adjacent to both sides,
add up the first score, the second score, and the third score of corresponding pixels in the first image, the second image, and the third image, respectively, and
assign a threshold to a component of the matrix for masking corresponding to a position with a highest one of a plurality of added-up scores to adjust the dithering to achieve masking.

4. The liquid discharge apparatus according to claim 3, wherein the circuitry is configured to
increase, in the third image, weight of the third score, on the shadow side, assigned to the pair of pixels adjacent to both sides in the main scanning direction of the plurality of pixels corresponding to the plurality of thresholds in the matrix for masking to be greater than the weight of the third score, on the highlight side, assigned to the pair of pixels adjacent to both sides in the main scanning direction of the plurality of pixels corresponding to the plurality of thresholds in the matrix for masking, and
add up the first score, the second score, and the third score.

5. A method of discharging liquid, the method comprising:
obtaining image data to be printed;
performing dithering to achieve masking and halftone processing on the image data to generate print data; and
controlling movement of a discharge head and discharge of ink based on the print data,
the controlling including
increasing a ratio of a number of ink dots of the ink continuously discharged onto a recording medium in a main scanning direction in a grayscale on a shadow side indicated by the print data to a total number of ink dots of the ink discharged onto the recording medium in one-time scanning by the discharge head in one line in the main scanning direction to be greater than a ratio of a number of ink dots of the ink continuously discharged onto the recording medium in the main scanning direction in a grayscale on a highlight side indicated by the print data to the total number of ink dots of the ink discharged onto the recording medium in the one-time scanning by the discharge head in the one line in the main scanning direction, and
increasing a ratio of a number of points at which ink dots of the ink are superimposed on top of one another in the grayscale on the shadow side indicated by the print data to all points on the recording medium in the one line in the main scanning direction when the ink is discharged at same coordinates on the recording medium in a one-time scanning and another one-time scanning performed by the discharge head to be greater than a ratio of a number of points at which ink dots of the ink are superimposed on top of one another in the grayscale on the highlight side indicated by the print data to all points on the recording medium in the one line in the main scanning direction when the ink is discharged at same coordinates on the recording medium in the one-time scanning and the another one-time scanning performed by the discharge head.

6. A non-transitory computer-readable recording medium storing a program for causing a computer to execute a method, the method comprising:
obtaining image data to be printed;
performing dithering to achieve masking and halftone processing on the image data to generate print data; and controlling movement of a discharge head and discharge of ink based on the print data, the controlling including increasing a ratio of a number of ink dots of the ink continuously discharged onto a recording medium in a main scanning direction in a grayscale on a shadow side indicated by the print data to a total number of ink dots of the ink discharged onto the recording medium in one-time scanning by the discharge head in one line in the main scanning direction to be greater than a ratio of a number of ink dots of the ink continuously discharged onto the recording medium in the main scanning direction in a grayscale on a highlight side indicated by the print data to the total number of ink dots of the ink discharged onto the recording medium in the one-time scanning by the discharge head in the one line in the main scanning direction, and increasing a ratio of a number of points at which ink dots of the ink are superimposed on top of one another in the grayscale on the shadow side indicated by the print data to all points on the recording medium in the one line in the main scanning direction when the ink is discharged at same coordinates on the recording medium in a one-time scanning and another one-time scanning performed by the discharge head to be greater than a ratio of a number of points at which ink dots of the ink are superimposed on top of one another in the grayscale on the highlight side indicated by the print data to all points on the recording medium in the one line in the main scanning direction when the ink is discharged at same coordinates on the recording medium in the one-time scanning and the another one-time scanning performed by the discharge head.

* * * * *